United States Patent
Eisen et al.

(10) Patent No.: US 11,074,333 B2
(45) Date of Patent: Jul. 27, 2021

(54) ANTI-REPLAY AUTHENTICATION SYSTEMS AND METHODS

(71) Applicant: Trusona, Inc., Scottsdale, AZ (US)

(72) Inventors: Ori Eisen, Scottsdale, AZ (US); Clayton Lengel-Zigich, Scottsdale, AZ (US); Nikolas Mangu-Thitu, Lexington, KY (US)

(73) Assignee: Trusona, Inc., Scottsdale, AZ (US)

( * ) Notice: Subject to any disclaimer, the term of this patent is extended or adjusted under 35 U.S.C. 154(b) by 0 days.

(21) Appl. No.: 16/247,835

(22) Filed: Jan. 15, 2019

(65) Prior Publication Data
US 2019/0147159 A1    May 16, 2019

Related U.S. Application Data

(63) Continuation of application No. PCT/US2017/044371, filed on Jul. 28, 2017.
(Continued)

(51) Int. Cl.
*G06F 21/00* (2013.01)
*G06F 21/36* (2013.01)
(Continued)

(52) U.S. Cl.
CPC .............. *G06F 21/36* (2013.01); *G06F 21/34* (2013.01); *G06K 7/1417* (2013.01);
(Continued)

(58) Field of Classification Search
CPC ... G06F 21/34; G06F 21/36; G06K 19/06037; H04W 12/06; H04W 12/00522; H04W 12/77
See application file for complete search history.

(56) References Cited

U.S. PATENT DOCUMENTS 5,913,542 A    6/1999    Belucci et al.
7,379,921 B1    5/2008    Kiliccote
(Continued)

FOREIGN PATENT DOCUMENTS

JP    4961214 B2    6/2012
JP    2015503866 A    2/2015
(Continued)

OTHER PUBLICATIONS

EP17757353.2 The Extended European Search Report dated Jun. 11, 2019.
(Continued)

*Primary Examiner* — Joseph P Hirl
*Assistant Examiner* — Chi D Nguy
(74) *Attorney, Agent, or Firm* — Wilson Sonsini Goodrich & Rosati

(57) ABSTRACT

Systems and methods for authentication with resistance to replay attacks are provided. A device may be used to capture image data of a physical token to authenticate or identify a user. Authentication information may be obtained by processing and analyzing the captured image data. Data about a state of the imaging device and the captured image data may be used for fraud detection. The data may be collected when the image data is processed and analyzed. The state of the imaging device and captured image data are unlikely to be repeated. The detected repetition of a state of the imaging device and captured image data may be a cause for increasing the likelihood that a replay attack is taking place. The device may be used to perform a transaction.

17 Claims, 9 Drawing Sheets

Related U.S. Application Data

(60) Provisional application No. 62/368,969, filed on Jul. 29, 2016.

(51) Int. Cl.
  *G06F 21/34* (2013.01)
  *G06K 7/14* (2006.01)
  *G06K 19/06* (2006.01)
  *H04W 12/06* (2021.01)
  *H04W 12/77* (2021.01)

(52) U.S. Cl.
  CPC ......... *G06K 7/1443* (2013.01); *G06K 7/1456* (2013.01); *G06K 19/06037* (2013.01); *H04W 12/06* (2013.01); *H04W 12/77* (2021.01)

(56) References Cited

U.S. PATENT DOCUMENTS

| | | | |
|---|---|---|---|
| 7,578,436 | B1 | 8/2009 | Kiliccote et al. |
| 7,613,929 | B2 | 11/2009 | Cohen et al. |
| 7,991,388 | B1 | 8/2011 | Becker et al. |
| 8,291,220 | B2 | 10/2012 | Singh |
| 8,385,971 | B2 | 2/2013 | Rhoads et al. |
| 8,550,903 | B2 | 10/2013 | Lyons et al. |
| 8,655,782 | B2 | 2/2014 | Poon et al. |
| 8,805,110 | B2 | 8/2014 | Rodriguez et al. |
| 8,929,877 | B2 | 1/2015 | Rhoads et al. |
| 8,973,095 | B2 | 3/2015 | Smith et al. |
| 8,983,207 | B1 | 3/2015 | Ran et al. |
| 9,118,662 | B2 | 8/2015 | Corrion et al. |
| 9,143,496 | B2 | 9/2015 | Etchegoyen |
| 9,596,237 | B2 | 3/2017 | Law et al. |
| 9,769,664 | B1* | 9/2017 | Kavaler .............. H04L 63/0428 |
| 2007/0063050 | A1 | 3/2007 | Attia et al. |
| 2007/0102521 | A1 | 5/2007 | Petersson et al. |
| 2009/0150294 | A1 | 6/2009 | March et al. |
| 2010/0040293 | A1 | 2/2010 | Hermann et al. |
| 2010/0268949 | A1 | 10/2010 | Schuetze |
| 2011/0200234 | A1 | 8/2011 | Takahashi et al. |
| 2011/0219427 | A1* | 9/2011 | Hito ......................... G06F 21/00 726/3 |
| 2012/0035924 | A1* | 2/2012 | Jitkoff ..................... G10L 15/24 704/235 |
| 2012/0150742 | A1 | 6/2012 | Poon et al. |
| 2013/0116964 | A1 | 5/2013 | Van et al. |
| 2013/0182002 | A1* | 7/2013 | Macciola ................ G06F 17/40 345/589 |
| 2014/0105449 | A1 | 4/2014 | Caton et al. |
| 2014/0282933 | A1 | 9/2014 | Etchegoyen |
| 2014/0337930 | A1 | 11/2014 | Hoyos et al. |
| 2015/0178724 | A1 | 6/2015 | Ngo et al. |
| 2015/0254443 | A1 | 9/2015 | Blessing et al. |
| 2015/0365238 | A1 | 12/2015 | Hui et al. |
| 2016/0057248 | A1* | 2/2016 | Tankha ................. H04L 67/306 726/6 |
| 2016/0125180 | A1* | 5/2016 | Smith ................... H04L 9/0822 726/7 |
| 2016/0140357 | A1 | 5/2016 | Newell |
| 2017/0251014 | A1 | 8/2017 | Eisen |
| 2018/0048474 | A1* | 2/2018 | Landrock ................ G06F 21/44 |

FOREIGN PATENT DOCUMENTS

| | | |
|---|---|---|
| WO | WO-2014075011 A1 | 5/2014 |
| WO | WO-2015093734 A1 | 6/2015 |
| WO | WO-2016141352 A1 | 9/2016 |
| WO | WO-2017147494 A1 | 8/2017 |
| WO | WO-2018022993 A1 | 2/2018 |
| WO | WO-2020041739 | 2/2020 |

OTHER PUBLICATIONS

International Search Report and Written Opinion dated May 15, 2017 for International PCT Patent Application No. PCT/US2017/019454.
U.S. Appl. No. 15/441,661 Office Action dated Jan. 8, 2019.
U.S. Appl. No. 15/441,661 Office Action dated Jul. 30, 2019.
International Search Report and Written Opinion dated Nov. 1, 2017 for International Patent Application No. PCT/US2017/044371.
PCT/US2019/047964 International Search Report dated Dec. 13, 2019.
Co-pending U.S. Appl. No. 16/788,156, filed Feb. 11, 2020.
EP17835339.7 Extended Search Report dated Jan. 7, 2020.
U.S. Appl. No. 15/441,661 Notice of Allowance dated Jan. 13, 2020.

* cited by examiner

| Transaction ID 501 | Identification data 503 | Nonce data 505 |
|---|---|---|
| TID 1 | ID 1 | ND 1 |
| TID 2 | ID 2 | ND 2 |
| TID 3 | ID 1 | ND 3 |
| TID 4 | ID 2 | ND 2 |
| ... | ... | ... |

FIG. 5

ANTI-REPLAY AUTHENTICATION SYSTEMS AND METHODS

CROSS-REFERENCE TO RELATED APPLICATIONS

This application is a Continuation Application of International Patent Application PCT/US2017/044371, filed Jul. 28, 2017, which claims the priority and benefit of U.S. Provisional Application No. 62/368,969 filed on Jul. 29, 2016, the entire contents of which are incorporated herein by reference.

BACKGROUND OF THE INVENTION

Replay attacks play a large role in fraudulent transactions, particularly electronic transactions. In a replay attack, data from an earlier transaction is fraudulently or maliciously repeated in a new transaction, particularly to authenticate a user or device.

Machine readable secure identity tokens are known to be used in authentication, such as the barcode on a driver license or any other type of ID card. As the use of mobile phone cameras, the conventional physical token can be scanned by the digital camera and used for authentication or identification. However, such a static security token is subjected to replay attacks.

SUMMARY OF THE INVENTION

Accordingly, a need exists for improved systems and methods for authentication of a user identity with resistance to replay attacks.

In one aspect of the invention, a method of performing anti-replay analysis is provided. Methods and systems are provided for user authentication using tokens with resistance to replay attacks. A user device equipped with a camera may be used to take an image of a physical token during a transaction. Data relating to a state of the image, a state of the camera or a state of the user device may be collected at the time of a transaction. Such data may be used to create a singularity value or a 'nonce' which may not be repeated, or is extremely unlikely to be repeated. If nonce data is identically repeated in a subsequent transaction, it may raise a red flag that may indicate that the subsequent transaction is a likely replay attack, since it extremely unlikely the nonce data would repeat.

In one aspect, a method for authenticating a user or a transaction is provided. The method comprises: capturing image data of a physical token using a user device, wherein the image data includes a graphical code; obtaining identification information about the user from the image data; collecting nonce data comprising (1) a physical state of the user device or (2) a characteristic of the image data that is unique to the user device at a moment in time during which the nonce data is collected; and authenticating, with aid of one or more processors, the user or the transaction based on (1) the identification information and (2) the nonce data.

In some embodiments, the physical token comprises the graphical code that comprises the identification information about the user. In some embodiments, the physical token is issued by an authority entity and is associated with an identity of the user.

In some embodiments, the nonce data comprises at least two of the following: (i) one or more operational parameters of an imaging device coupled to the user device for the operation of capturing the image data, (ii) positional information about the imaging device or the user device, and (iii) characteristics of the image data derived from image processing of the image data. In some cases, the nonce data about the physical state of the user device comprises data collected by one or more sensors. In some cases, the physical state of the user device comprises data indicative of a physical state of a component of the user device, and in some situations the component is selected from the group comprising an imaging device, a power supply unit, a processor, and a memory. In some embodiments, the characteristic of the image data comprises at least one of the following: (i) one or more parameters produced during image processing, (ii) one or more properties of the raw image data, and (iii) one or more properties of the processed image data.

In some embodiments, the nonce data is encrypted such that when the nonce data comprises two or more factors, and these factors are not accessible by the one or more processors. In some embodiments, the nonce data and identification data are compared with a previously collected nonce data and a previously collected identification data to determine a presence of a replay attack.

In another aspect, a system for performing authentication of a user or a transaction is provided. The system comprises: a server in communication with a user device configured to permit a user to perform a transaction, wherein the server comprises: (i) a memory for storing a set of software instructions, and (ii) one or more processors configured to execute the set of software instructions to: receive nonce data comprising (1) a physical state of the user device and (2) a characteristic of an image data that is unique to the user device at a moment in time during which the nonce data are collected, wherein the image data comprises a graphical code; receive the image data of a physical token possessed by the user; obtain identification information about the user from the image data; and authenticate the user or the transaction based on (1) the identification information and (2) the nonce data.

In some embodiments, the physical token comprises the graphical code that comprises the identification information about the user. In some embodiments, the physical token is issued by an authority entity and is uniquely associated with an identity of the user.

In some embodiments, the nonce data comprises at least two of the following: (i) one or more operational parameters of an imaging device coupled to the user device for the operation of capturing the image data, (ii) positional information about the imaging device or the user device, and (iii) the characteristic of the image data derived from image processing of the image data. In some cases, at least one of the one or more operational parameters of the imaging device is varied in response to an instruction generated by the system. In some embodiments, the physical state of the user device comprises data collected by one or more sensors. In some embodiments, the physical state of the user device comprises data indicative of a physical state of a component of the user device, and wherein the component is selected from the group comprising an imaging device, a power supply unit, a processor, and a memory. In some embodiments, the characteristic of the image data comprises at least one of the following: (i) one or more parameters produced during image processing, (ii) one or more properties of the raw image data, and (iii) one or more properties of the processed image data. In some embodiments, the nonce data and identification data are compared with a previously collected nonce data and a previously collected identification data to determine a presence of a replay attack.

In another aspect, a method for authenticating a user or a transaction with anti-replay protection is provided. The method comprises: capturing image data of a physical token using a user device; collecting nonce data about (1) a physical state of the user device related to the operation of capturing the image data or (2) a characteristic of the image data that is unique to the user device at a moment in time during which the nonce data is collected; obtaining identification information about the user device or the user; comparing, with aid of one or more processors, the nonce data and the identification information with a previously collected nonce data and a previously collected identification information; and determining, with aid of the one or more processors, a presence of a replay attack based on whether the nonce data and the previously collected nonce state data are identical. In some embodiments, the nonce data comprises at least one of the following: (i) one or more operational parameters of an imaging device coupled to the user device during the operation of capturing the image data, (ii) positional information about the imaging device or the user device, and (iii) one or more characteristics of the image data derived from image processing of the image data.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which:

FIG. 5 shows examples of how data may be stored for various transactions, in accordance with embodiments of the invention.

DETAILED DESCRIPTION OF THE INVENTION

Figure 1:
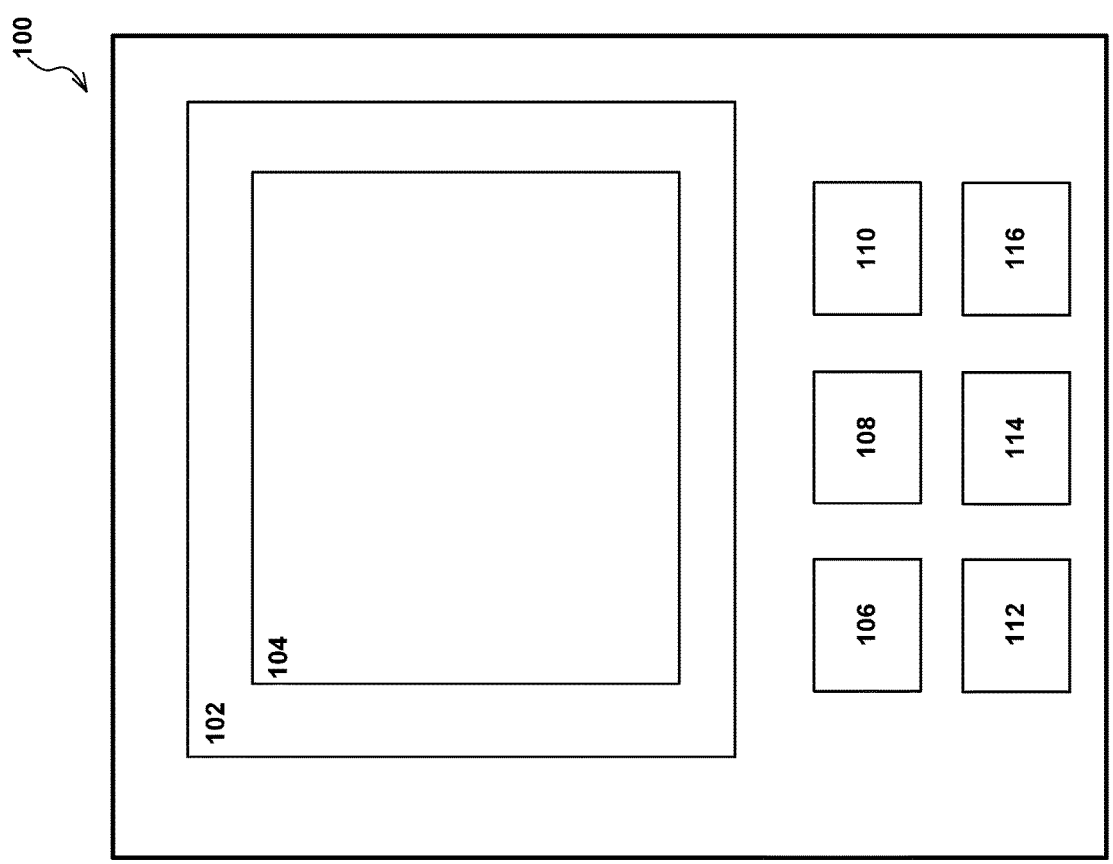
FIG. 1 shows an example of a device that may aid in conducting a transaction that requires authentication, in accordance with embodiments of the invention.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for user authentication using tokens with resistance to replay attacks. Various aspects of the invention described herein may be applied to any of the particular applications set forth below. The invention may be applied as an authentication system or as a standalone anti-replay system, fraud detection software, or any transaction process that requires identity verification or authentication. It shall be understood that different aspects of the invention can be appreciated individually, collectively or in combination with each other.

Transactions may be events or activities that require user authentication or identity verification. User identity information may be provided based on a physical token, such as a machine readable secure identity token (e.g., barcode on the user's ID card). For on online transaction, users may scan the physical token and transmit the ID information to a service provider for identity verification. Transactions may occur online, where data may be easily intercepted. For instance, information about a user during a first transaction may be recorded. The recorded information may be used in a subsequent transaction in a replay attack, to appear to be the same user that appeared in the first transaction, or permit the subsequent transaction to go through. The recorded information may pertain to conditions of the first transaction, such as nonce data related to a state of scanned image data or an imaging device used in the first transaction. Detection of a repetition of nonce data may indicate a replay attack is occurring.

In some embodiments, nonce data may be collected relating to a state of a scanned image or an imaging device during the first transaction. The nonce data may include one or more sets of singularity values (e.g., nonce factors) that may realistically only occur once, and would not naturally be repeated. Thus, repetition of the nonce data may be cause for suspicion that a replay attack may be occurring. The nonce data may relate to an internal state of the imaging device or component of the imaging device, or may include data that may be collected relating to a scanned image that contains identification data of a user. The nonce data may include image capture information such as metadata, positional information, or any other information relating to the imaging device. The nonce data may also include data generated during processing the image for context analysis.

Nonce data may be collected with aid of one or more sensors and one or more processors. The sensor(s) and processor(s) may be on-board the device. The sensor(s) and processor(s) may or may not require the use of external signals or data collected from outside the device.

FIG. 1 shows an example of a device 100 that may aid in conducting a transaction that requires authentication, in accordance with embodiments of the invention. The device may be a user device that includes a display 102, and may include an interface 104 for performing a transaction using the device. The device may include one or more memory storage units 106, one or more processors 108, one or more communication units 110, one or more power source 112, and/or one or more sensors 114, 116.

The user device 100 may be an electronic device capable of aiding in a transaction or identifying and/or authenticating a user. The user device may be mobile device (e.g., smartphone, tablet, pager, personal digital assistant (PDA)), a computer (e.g., laptop computer, desktop computer, server, or any other type of device. The user device may optionally be portable. The user device may be handheld. The user device may be lightweight. In some embodiments, the user device may weigh 10, 8, 6, 5, 4, 3, 2, 1.5, 1, 0.7, 0.5, 0.3 0.1, 0.05, 0.01, 0.005, or 0.001 kg or less.

The user device may be a network device capable of connecting a network, such as a local area network (LAN), wide area network (WAN) such as the Internet, a telecommunications network, a data network, or any other type of network. The user device may be capable of direct or indirect wireless communications. The user device may be capable of peer-to-peer (P2P) communications and/or communications with cloud-based infrastructure.

The user device may be used during transactions (such as financial transactions) with a transaction entity. Transactions may include the exchange of finances (e.g., money, notes, debt, loans, etc.). The transactions may include the exchange of goods or services. The transactions may include the exchange of information. The transactions may include user identity verification or authentication to a user access to information or a place. In some instances, the transactions may include the exchange of data that is sensitive and/or is not publicly available. A transaction entity may include any entity involved in a transaction. A transaction entity may be an individual, company, partnership, corporation, organization, group, host, or any other type of entity. In some examples transaction entities may include financial institutions (e.g., banks, financial management companies), merchants (e.g., stores, online merchants), social networking companies, non-profit organizations, health care organizations, educational institutions, governmental bodies or agencies, or any other type of entity. The user device may be capable of communicating directly or indirectly with a transaction entity. In some embodiments, the transaction entities may use or be a server or other type of online host. The user device may communicate with the server and/or other host device of the transaction entities.

The user device may include a display 102. The display may show in real time one or more static images (e.g., photographs) and/or dynamic images (e.g., video) captured by an imaging device. The display may be able to present information to a user. The display may visually illustrate information. The information shown on the display may be changeable. The display may include a screen, such as a liquid crystal display (LCD) screen, light-emitting diode (LED) screen, organic light-emitting diode (OLED) screen, plasma screen, electronic ink (e-ink) screen, touchscreen, or any other type of screen or display. The display may or may not accept user input.

The display may show a graphical user interface 104. The graphical user interface may be part of a browser, software, or application that may aid in the user performing a transaction using the device. The interface may allow the user to self-identify using the device. The user may access a user account using the device. The user account may be used during a transaction. The user device may be capable of operating one or more software applications. One or more applications may or may not be related to an electronic transaction. One or more applications may require or use user identification and/or authentication.

The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device.

The user device may comprise one or more memory storage units 106 which may comprise non-transitory computer readable medium comprising code, logic, or instructions for performing one or more steps. The user device may comprise one or more processors 108 capable of executing one or more steps, for instance in accordance with the non-transitory computer readable media. The one or more memory storage units may store one or more software applications or commands relating to the software applications. The one or more processors may, individually or collectively, execute steps of the software application.

A communication unit 110 may be provided on the device. The communication unit may allow the user device to communicate with an external device. The external device may be a device of a transaction entity, server, or may be a cloud-based infrastructure. The communications may include communications over a network or a direct communication. The communication unit may permit wireless or wired communications. Examples of wireless communications may include, but are not limited to WiFi, 3G, 4G, LTE, radiofrequency, Bluetooth, infrared, or any other type of communications. The communications unit may or may not aid in collecting data used for determination of nonce data.

The device may have an on-board power source 112. Alternative, an external power source may provide power to power the user device. An external power source may provide power to the user device via a wired or wireless connection. An on-board power source may power an entirety of the user device, or one or more individual components of the wireless device. In some embodiments, multiple on-board power sources may be provided that may power different components of the device. For instance, one or more sensor of the device may be powered using a separate source from one or more memory storage unit, processors, communication unit, and/or display of the device.

The user device may comprise an imaging sensor serves as imaging device 114. The imaging device 114 may be on-board the user device. The imaging device can include hardware and/or software element. In some embodiments, the imaging device may be a camera operably coupled to the user device. In some alternative embodiments, the imaging device may be located external to the user device, and image data of a graphical element such as barcode may be transmitted to the user device via communication means as described elsewhere herein. The imaging device can be controlled by an application/software configured to scan a visual code. In some embodiments, the camera may be configured to scan a barcode on an ID card, a passport, a document, or displayed on an external display. In some embodiments, the software and/or applications may be configured to activate the camera on the user device to scan the code. In other embodiments, the camera can be controlled by a processor natively embedded in the user device.

The imaging device 114 may be a fixed lens or auto focus lens camera. An imaging device may make use of complementary metal oxide semiconductor (CMOS) sensors that generates electrical signals in response to wavelengths of light. The resultant electrical signals can be processed to produce image data. The imaging device may include a lens configured to direct light onto an imaging sensor. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. The camera may comprise optical elements (e.g., lens, mirrors, filters, etc). The camera may capture color images, greyscale image, and the like.

The imaging device 114 may be a camera used to capture visual images around the device. Any other type of sensor may be used, such as an infra-red sensor that may be used to capture thermal images around the device. The imaging sensor may collect information anywhere along the electromagnetic spectrum, and may generate corresponding images accordingly.

In some embodiments, the imaging device may be capable of operation at a fairly high resolution. The imaging sensor may have a resolution of greater than or equal to about 100 µm, 50 µm, 10 µm, 5 µm, 2 µm, 1 µm, 0.5 µm, 0.1 µm, 0.05 µm, 0.01 µm, 0.005 µm, 0.001 µm, 0.0005 µm, or 0.0001 µm. The image sensor may be capable of collecting 4K or higher images.

The imaging device may capture an image frame or a sequence of image frames at a specific image resolution. In some embodiments, the image frame resolution may be defined by the number of pixels in a frame. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels.

The imaging device 114 may capture a sequence of image frames at a specific capture rate. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. illumination brightness).

A state of the imaging device 114 may include information relating to one or more operational parameters of the camera or an imaging sensor of the imaging device at the time an image is captured or a barcode is scanned. For instance, a state of the camera may include the exposure time, ISO speed rating, focal length, use of flash, light balancing, resolution, or any other information that may be varied with time, environment conditions such as lightening, orientation or position of the camera. In some embodiments, one or more additional sensors may be provided to supply additional information related to the state of the imaging device.

The user device may have one or more sensors 116 on-board the device to provide instantaneous positional and attitude information of the imaging device. In some embodiments, the positional and attitude information may be provided by sensors such as a location sensor (e.g., Global Positioning System (GPS)), inertial sensors (e.g., accelerometers, gyroscopes, inertial measurement units (IMUs)), altitude sensors, attitude sensors (e.g., compasses) pressure sensors (e.g., barometers), and/or field sensors (e.g., magnetometers, electromagnetic sensors) and the like.

The one or more sensors 116 may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones), time sensors (e.g., clocks), temperature sensors, sensors capable of detecting memory usage and/or processor usage, or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

Any number of sensors may be provided on-board the user device. The sensors may include different types of sensors, or the same types of sensors. The sensors and/or any other components described herein may be enclosed within a housing of the device, embedded in the housing of the device, or on an external portion of the housing of the device. The housing may or may not form a fluid-tight (e.g., water-tight or airtight) seal separating the interior of the housing and/or the exterior of the housing.

The one or more sensors 116 may collect information continuously in real-time, or may be collecting information on a periodic basis. In some embodiments, the sensors may collect information at regular time intervals, or at irregular time intervals. The sensors may collect information at a high frequency (e.g., every minute or more frequently, every 10 seconds or more frequently, every second or more frequently, every 0.5 seconds or more frequently, every 0.1 seconds or more frequently, every 0.05 seconds or more frequently, every 0.01 seconds or more frequently, every 0.005 seconds or more frequently, every 0.001 seconds or more frequently, every 0.0005 seconds or more frequently, or every 0.0001 seconds or more frequently). The sensors may collect information according to a regular or irregular schedule.

The sensors may collect information in response to a detected event. In some embodiments, the sensors may collect information when a transaction that requires user identification/authentication is being initiated, completed, or at any state in-between. The sensors may collect information when the user is being authenticated. For instance, the sensors may collect information when the user is logging in. The sensors may collect information when the imaging device is activated for capturing an image. The sensors may collect information when the user is trying to access a user account. The sensors may collect information when the user makes a request to complete a transaction. The sensors may collect information when the user requests to receive or send money.

The sensors may collect information at a single point in time or multiple points in time. In some embodiments, the sensors may collect information over a time interval (e.g., on a periodic basis, continuously, etc.). In some embodiments, the time interval may be less than or equal to 10 seconds, 5 seconds, 3 seconds, 2 seconds, 1 second, 0.5 seconds, 0.3 seconds, 0.1 seconds, 0.05 seconds, 0.01 seconds, 0.005 seconds, 0.001 seconds, 0.0005 seconds, or 0.0001 seconds. Alternatively, the time interval may be greater than or equal to any of the values described herein, or may fall within a range between any two of the values described herein.

A state of the imaging device may include positional information relating to the imaging device. For instance, positional information may include spatial location of the imaging device (e.g., geo-location). In some embodiments, positional information may include a latitude, longitude, and/or altitude of the imaging device. In some embodiments, the positional information may be expressed as coordinates. The positional information may include an orientation of the imaging device. For instance, the positional information may include an orientation of the device with respect to one, two, or three axes (e.g., a yaw axis, pitch axis, and/or roll axis). The positional information may be an attitude of the imaging device. The positional information may be determined relative to an inertial reference frame (e.g., environment, Earth, gravity), and/or a local reference frame.

The positional information may include movement information of the imaging device. For instance, the positional information may include linear speed of the device or linear acceleration of the device relative to one, two, or three axes. The positional information may include angular velocity or angular acceleration of the device about one, two, or three axes. The positional information may be collected with aid of one or more inertial sensors, such as accelerometers, gyroscopes, and/or magnetometers.

A state of the imaging device may also include environmental information collected by the user device at the time an image is captured. The environmental information may include audio information collected by a microphone of the device. The environmental information may include information collected by a motion detector, an ultrasonic sensor, lidar, temperature sensor, pressure sensor, or any other type of sensor that may collect environmental information about the device. The environmental information may include detecting the touch or hand position of a user holding the device, and collecting which portions of the device or touched or held by the user.

The imaging sensor as described herein may be used to capture image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The image data can be any image format (e.g. EPS or SVG vector graphs, PNG, GIF, or JPEG raster graphics format, etc). The image data used for authentication may or may not be stored in a database.

A state of the captured image may include the information of the raw image (e.g., metadata) or data involved in image processing. In some cases, the image data may be processed in order to extract information encoded in a region of interest. The region of interest in the captured image may have a deformed shape, variable intensity, resolution, size because of being captured from an imaging device maneuvered by a user. For instance, a scanned image that contains a physical representation such as a barcode may be analyzed or processed. The barcode shape may be normalized using various algorithms or methods. For example, the barcode shape may firstly be recognized by edge and/or corner detection, normalized by inverse perspective transformation, transformed to binary image data and decoded. A large amount of parameters may be generated during image processing operations (e.g., de-skewness, crop, normalization, enhancement, filtering, etc). In some cases, image processing may be applied in order to extract identity information encoded in the barcode. In another instance, the large amount of parameters may be obtained from an analysis of the image characteristics or properties (e.g., intensity, width, height, resolution, etc). Details about the nonce data related to image or image processing are described later herein.

The information related to the state of the imaging device and the image data may be stored as nonce data. The nonce data may contain information generated from one or more sensors as well as one or more processors.

In some embodiments, the nonce data may comprise information generated from sensor data. In some embodiments, information from a single sensor may be stored as nonce data. Alternatively, information from multiple sensors may be stored as nonce data. The nonce data may include sensor information collected at a single point in time, or over a time interval. The nonce data may include raw sensor information, or may include sensor information that has been processed. The nonce data may be generated based on the sensor information. In some embodiments, the nonce data may be derived from, or a hash of the sensor information. The nonce data may be derived from at least some sensor information that should not be repeated realistically. For instance, the position (e.g., orientation) of the imaging device is unlikely to repeat exactly at a high level of specificity. The nonce data should not be repeated realistically. The nonce data would realistically only occur at a single time. The nonce data may represent a singularity value that can very likely only be generated or used once. Thus, any repetition of nonce data may be a signal that a replay attack may be occurring.

The nonce data may be generated at the same frequency at which sensor data is collected. Alternatively, the nonce data may be generated less frequently than the sensor data is collected. In one example, the sensor data may collect information continuously or at a high frequency, while the nonce data may be generated and/or stored in response to a detected event. In some embodiments, all of the collected sensor data may be used to generate nonce data. Alternatively, a portion of the collected sensor data may be used to generate the nonce data.

In some embodiments, the nonce data may further comprise data generated by one or more processors related to analyzing and/or processing the image data. The one or more processors may be on-board the user device. The one or more processors may be on-board the imaging device such as a microprocessor of the image capturing device. In some embodiments, the one or more processors may be configured to perform pre-processing of captured image data and output the image data along with metadata to other processors. In some embodiments, the one or more processors may be configured to process the captured image data, such as perform pattern recognition to extract identity information from a visual token contained in the image data. Accordingly, various parameters and characteristics of the visual token image may be generated during the image processing operations and/or analysis. The parameters may be obtained during pre-processing operations such as auto-adjustment of the raw image by the image capturing device (e.g., balance correction, gamma correction, de-mosaicing, de-speckle, etc). The parameters may be obtained during image processing operations in order to recognize a physical token and/or decode the token, such as image segmentation, edge detection, corner detection, pattern detection, measure image skew angle and rotation, measure pixel content and histograms, image scaling, smoothing, morphological filters and the like. The operations may be applied to the whole image or the recognized region of interest.

The nonce data may include the data related to a state of an imaging device and a state of captured image data. The data may be collected at the time an image of a visual token is captured, processed and analyzed for authentication. In some embodiments, all of the collected data may be used to generate nonce data. Alternatively, not all of the collected data may be used to generate the nonce data.

The nonce data may be generated on-board the device. For instance, the nonce data may be generated using one or more processors of the device. The nonce data may be stored in one or more memory storage units of the device. The nonce data may be transmitted with aid of the communication unit, to an external device or network. Alternatively, the nonce data may be generated off-board the device. Data from one or more sensors and one or more processors on-board the user device may be transmitted, with aid of the communication unit, to an external device or network. The data from the sensors and processors may or may not be stored in memory before being transmitted. The data from the sensors and processors may be used at an external device or network to generate nonce data.

Figure 2:
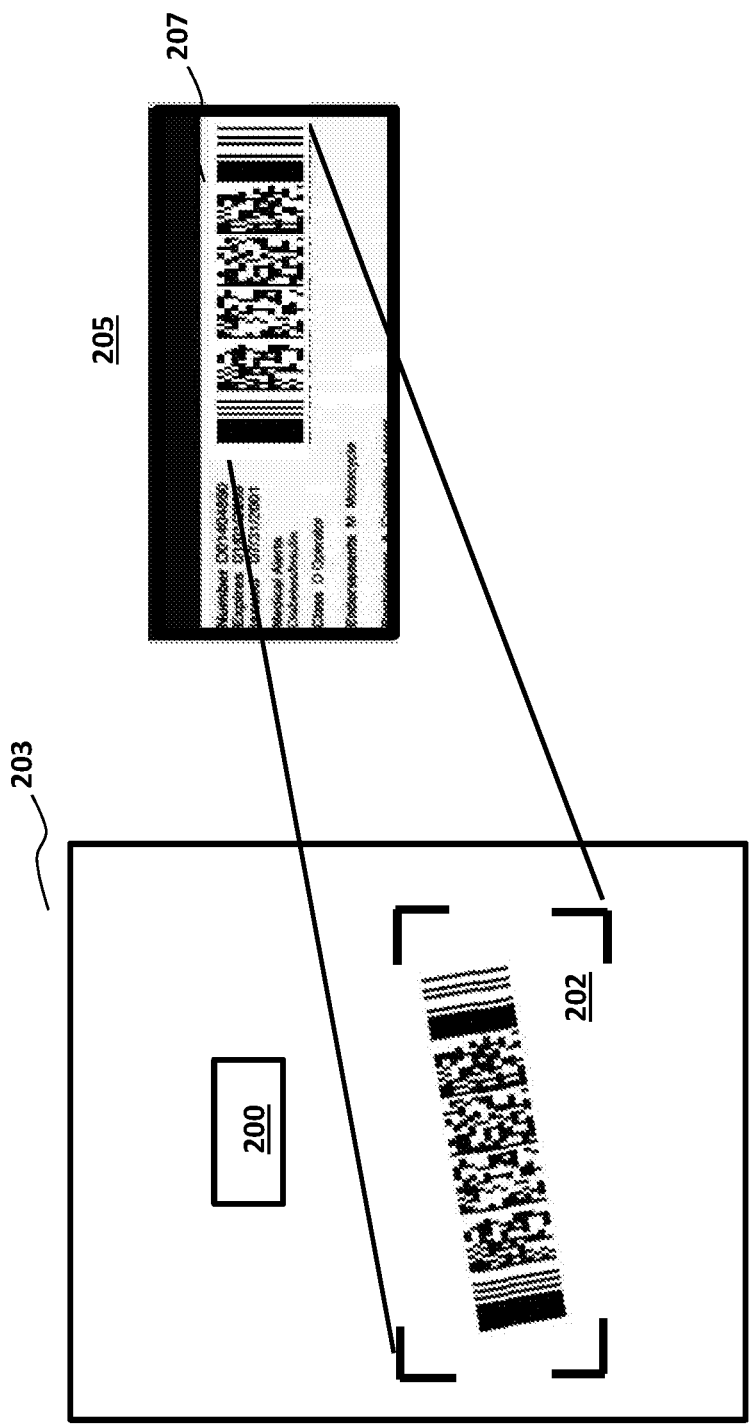
FIG. 2 shows an example of using a user device to capture a physical token for authentication, in accordance with embodiments of the invention.

FIG. 2 shows an example of using a user device 203 to capture a physical token 207 for authentication, in accordance with embodiments of the invention. The user device 203 may be used to generate both identification data and nonce data by capturing an image of the physical token 207 and use the data for authentication.

Identification data may contain information used to authenticate or verify identity of a user. The identification data may contain personal information such as name, date of birth, address, nationality and the like that describe identity of a user. The identification data may contain product information such as instructions, purchase options, service provider information and the like that describe identity of a product or a service. The identification data may contain any type of information that can uniquely identify a user, a service, a transaction and the like. The identification data may contain information pertaining to the same user, same service, or same transaction. In some embodiments, the information or identifier may be cypher text that is previously encrypted in the identification data. A secret key or password may be required to decrypt the information. In other embodiments, the identification data may be plain text that is unencrypted data.

In some embodiments, the identification data may be encoded in a physical token 207. The physical token may be a visual graphical element that can be scanned by suitable device (e.g. barcode readers, optical scanners, cameras) or can be machine-readable. The visual graphical element can be any format, such as a bar code, text, a picture, a sequence thereof, or the like that can be captured and/or displayed on a device. The visual graphical element may be two-dimensional barcode such as PDF417, Aztec, MaxiCode, and QR code, etc. The visual graphical element may be one-dimensional barcode such as Interleaved ⅖, Industrial ⅖, Code 39, Code 39 Extended, Codabar, Code 11, Code 128, Code 128 Extended, EAN/UCC 128, UPC-E, UPC-A, EAN-8, EAN-13, Code 93, Code 93 Extended, DataBar Omnidirectional (RSS-14), DataBar Truncated (RSS-14 Truncated), DataBar Limited (RSS Limited), DataBar Stacked, DataBar Expanded, DataBar Expanded Stacked and the like. The barcode can encode various types of information in any type of suitable format, such as binary, alphanumeric, or ASCII, and the code can be based on any standards. The visual graphical element may have various storage capacities that can encode certain amount of data, and variable physical size. In some embodiments, the barcodes may conform to known standards that can be read by standard barcode readers. In other embodiments, the barcode may be proprietary such that it can be read only by an authenticated application provided by an authentication system and authenticated the application may run on a user device. In some instances, only the authentication system or the authentication application can encrypt/decrypt the barcode.

FIG. 2 shows an exemplary physical element 205 with a physical token 207. In some embodiments, the physical token 207 may be a visual graphical code on a physical element 205 possessed by a user. The physical element 205 may be a card (ID card, driver license, payment card, library card, login card, etc), documents (passport, legal document, healthcare record, etc), and the like that are issued or provided by an entity or service provider. In some cases, the physical element may be a card, a paper document, or other form of credentials issued by an authority entity such as government, DMV, federal agency and the like. In some embodiments, the physical element may be a person's civil credential such as social security card, passport, driver license, e-passport, birth certificates, employee identity cards and the like. Additionally, the physical element may be used to establish identity of a user that may include records in a database, electronic identity information and the like.

In some embodiments, the physical token 207 may be a visual graphical code that can be displayed on a display device. The display device may be a computer (e.g., laptop computer, desktop computer), a mobile device (e.g., smartphone, tablet, pager, personal digital assistant (PDA)), a vending machine or the like requiring authentication or verification of the user to conduct a session or transaction utilizing the display device to complete the transaction running on a server (i.e. service provider). The display device may optionally be portable. The display device may be handheld.

A user device 203 may comprise an imaging device 200 that is used to capture image data of the physical token 207. The imaging device can be the same imaging device as described in FIG. 1. The image data may be static image data (e.g., photographs) or dynamic image data (e.g., video) as described elsewhere herein. In some embodiments, the captured photo may be shown on a display 202 of the user device. In some embodiments, a user may be allowed to visualize the barcode on the display 202 in real-time without capturing a photo of the barcode. In some cases, the display may inform the user whether a valid image is captured. An image with poor quality may be invalid to be used for decoding and authentication. Factors such as lightening, focus, stabilization and the like may affect the quality of an image. In some embodiments, the display may provide message indicating a read failure if a physical token cannot be decoded within a predetermined amount of time. In some embodiments, the user may be prompted to adjust distance between the target object and the user device, orientation or angle in order to capture the entire barcode region.

In other embodiments, the entire physical token may be required for authentication. In other embodiments, a portion of the barcode region may be enough for authentication. For example, 10%, 20%, 30%, 40%, 50%, 60%, 70%, 80%, 90% of the physical token may be captured in the image data for authentication and generating nonce data.

In some embodiments, a photo of the barcode 207 may be acquired and stored on the memory unit of the user device 203 for further image processing and decoding. Alternatively, the imaging device 200 may scan the barcode in real time without capturing a photo of the barcode. In this embodiment, the imaging device 200 may constantly acquire images of the barcode 207 and store them in memory. Each of these images is subsequently processed until the barcode is correctly decoded. Once barcode 207 has been decoded, the imaging device 200 may stop acquiring images of barcode.

In some cases, the captured image data may be processed to extract identification information for authentication. The physical token 207 as shown in FIG. 2 may be a region of interest that comprises black and white modules encoding identification information. The barcode region may be any shape such as rectangular, square, triangular, circular, oval and the like. The barcode region of interest may or may not have a boundary. For instance, the region of interest may be a rectangular region that contains PDF417 code and the PDF417 code may encode user's identification information such as name, address, date of birth and the like. In alternative cases, the identification information may not be provided by the captured image data. For example, the identification information may be a device ID or user ID associated with the user device or the authentication application.

In some embodiments, the encoded identification information may be previously encrypted and an encryption key may be required to decrypt the cypher text. For instance, a PDF417 code on a driver license can be decoded by a standard reader, however the decoded identification information may be previously encrypted by the issuer, such that an encryption key and encryption algorithm may be required in order to decrypt the identification data. In some cases, only an authority entity or a specific service provider may possess the encryption key and method. In other embodiments, the user device may possess the encryption key and method. The key and method may be standard. For example, data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256, AES, Blowfish, RSA and the like.

In some embodiments, the physical token may be processed and decoded to obtain identification data. The physical token may be read from an image captured at any orientation, size, lighting condition, and the like that may cause an image blurred, noisy, skewed, scaled, distorted, etc. Various characteristics of the image data containing the physical token may be analyzed during the process of image processing. The characteristics of the captured image data and the imaging device may be used to generate nonce data.

Figure 3:
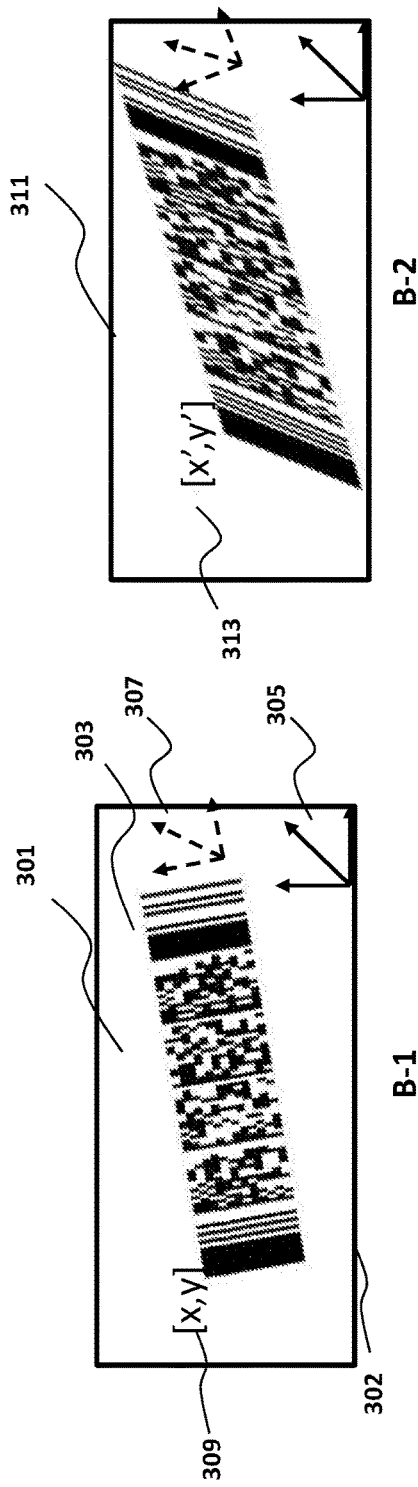
FIG. 3 shows examples of data generated during image capturing and processing that may be used as nonce data, in accordance with embodiments of the invention

FIG. 3 shows examples of data generated during image capturing and processing that may be used as nonce data, in accordance with embodiments of the invention. In some embodiments, the data may be about a state of the imaging device. Part A shows examples of local data about an imaging device that may be collected during image capturing. Local data about the imaging device may refer to a state of the imaging device or component of the imaging device such as an imaging sensor, optical elements, etc. The local data of the imaging device may include positional information, such as orientation of the device, geo-location and the like. The local data of the imaging device may include timestamps, such as the time an image is captured, time an image is modified, etc. The local data of the imaging device may include operational parameters that are event-based, such as focal length, ISO, frame rate, shutter speed, etc. In some embodiments, the local data may be collected from one or more sensors of the user device such as the GPS, IMU, accelerometers, and barometers as described elsewhere herein.

In some embodiments, the local data about an imaging device may be obtained from metadata of an image. The metadata may be data automatically attached to a photo. The metadata may contain variable data including technical information about an image and its capture method, such as exposure settings, capture time, GPS location information and camera model, etc. In some embodiments, the metadata is generated by a microprocessor on-board the imaging device.

The local data of an imaging device may include operational parameters. In some embodiments, the operational parameters may be event-based parameters. For instance, the exposure time may be varied based on the local illuminating light conditions. Focal length of the imaging device may be automatically varied based on the distance between the physical token and the imaging device. The ISO, shutter, aperture speed may be automatically adjusted according to pre-determined algorithms in order to accommodate variable environment and imaged object.

One or more processors on-board the imaging device may be provided that may aid in collecting operational parameters about the imaging device. For instance, an imaging device may have a first set of operational parameters at a first time capturing a physical token, and may have a different set of operational parameters at a second time capturing the same physical token. As previously described, the operational parameters may be automatically adjusted according to a pre-determined algorithm to accommodate the highly variable environment.

The local data of an imaging device may include positional information. In some embodiments, positional information may include a latitude, longitude, and/or altitude of the device. In some embodiments, the positional information may be expressed as coordinates. The positional information may include an orientation of the device. For instance, the positional information may include an orientation of the device with respect to one, two, or three axes (e.g., a yaw axis, pitch axis, and/or roll axis). The positional information may be an attitude of the device. The positional information may be determined relative to an inertial reference frame (e.g., environment, Earth, gravity), and/or a local reference frame.

One or more sensors may be provided that may aid in collecting positional information about the imaging device. For instance, the devices may be at different orientations over time. For instance, with respect to a static reference frame, the devices may have different orientation. The angles between the axes may change over time. As described above, the position information (e.g., angle information, spatial location information) may be determined to a high degree of accuracy and/or precision. An orientation of the device may be assessed over a single axis, two axes, or three axes. A spatial location of the device may be assessed along a single axis, two axes, or three axes.

The local data of an imaging device may also include timestamps such as the time an image is captured, the time an image is pre-processed by the processors on-board the imaging device, the time an image is stored and/or output.

Authentication events may occur at different points in time. A user may provide authentication and/or participate in a transaction at different points in time. While it is possible that the same imaging device may be used to capture the same physical token by the same user, it is highly unlikely that they will have a completely identical local data (e.g., operational parameters, positions, attitudes and/or timestamps) of the imaging device. At least some minor variation may be expected in the local data between authentication events. Thus, if the local data of the imaging device taken at different authentication events are completely identical, it may be likely that a replay attack is occurring. For instance, a fraudster may have previously recorded an authentication event (e.g., previous transaction, user authentication, account access), including the local data of the imaging device, and is replaying the previous authentication event. In one example, during a first authentication event, the local data of the imaging device may be read as shown in Part A. If during a second authentication event, the local data of the device is read to be exactly the same, this may be highly improbable and indicative of a replay attack. Particularly when the device is a mobile device or handheld device, the imaging device information is likely to change. Even if the device is resting on a surface during an authentication event, user interaction with the device may cause some imaging conditions (e.g., such as focus distance, line of sight) change. Even if the user does not directly touch the device, environmental conditions such as illumination may cause some parameters change (e.g., ISO speed, aperture speed, shutter speed, exposure time).

Part B illustrates examples of data may be collected from image processing and used as nonce data. The data collected may be related to a state of the image data. The data collected may be related to various characteristics of the image data. In some embodiments, the captured image data 301 may contain a region of interest 303. The region of interest may be a barcode region comprising patterns that encode identity information. The region of interest can be the same as described in FIG. 2. In some embodiments, the image data may be processed to decode the information. For instance, the captured image data may be deformed or distorted, in order to decode the barcode, the captured image data may need to be normalized such as rotated, deskewed, converted to binary image, cropped, denoised, resized, registered, and the like. The various operations may generate characteristics data that may be different with respect to different images captured.

For instance, as shown in part B, a rotated barcode region 303 may be captured with respect to a scanning region 302. The angle between the image coordinate 305 and the barcode coordinate 307 (i.e., orientation of the barcode with respect to an image frame) may be varied every time a user takes an image. For example, the image data 301 captured in a first authentication event is shown in scenario B-1, the coordinate of the upper left corner of the barcode region may be detected as [x,y] 309. In a second authentication event, the same graphical code may be captured and the image data 311 may be shown as in scenario B-2. The coordinate of the upper left corner of the same graphical code may be [x',y'] 313 that is different from the coordinate in the first authentication event.

Various characteristics or properties (e.g., skewness, rotation/orientation angle, width, height of the barcode region) of the image data may be different between authentication events. For instance, the distance between the imaging device and the target object may be translated into a large range of possible sizes (magnifications) that a barcode can have on a fixed size image sensor. In another instance, taking image of the barcode at an angle changes the apparent shape of the barcode to a viewer (skewness). A barcode with a rectangular shape B-1, when viewed straight-on, can look like a trapezoid (or irregular quadrilateral) B-2 when viewed from an angle. The location and addressing of image pixels for a barcode change dramatically when viewed from the side, or tilted.

The captured image data may be processed to decode authentication information. In some embodiments, data generated during image processing can be used as nonce data. Nonce data may be generated from various characteristics of the captured image data obtained from image processing. Various characteristics of the captured image data such as the coordinate of a corner of the detected barcode region, position of a gravity center of the captured image, size of the interested pattern, skewness, orientation thereof may be generated during image processing without additional calculation/operation. For instance, when the image data is processed to align the barcode region for analysis, the angle may be calculated and recorded. The coordinate (x,y) 309 of a corner of the barcode region with respect to the image coordinate may also be detected for pattern recognition. Other characteristics such as the height, width and histogram of the barcode region may also be analyzed during imaging processing and may be used as nonce data.

In other instances, the characteristics data may be generated from pre-processing. For example, the image data may be automatically corrected for white balance. The intensities of the component RGB colors may be adjusted in order to render certain colors correctly. Accordingly, during the process intensities are analyzed and can be used as nonce data.

Additionally, the characteristics data may be generated from the decoding process. For example, algorithms and methods may be performed to accommodate variations in brightness and contrast in the captured image data of barcode. This may be done through use of globally and locally adaptive image processing operations (e.g., thresholding, filtering, etc). In another example, pattern recognition techniques may be performed to recognize the barcode pattern. During this process, characteristics about a portion of the pattern with respect to the image coordinate may be collected and used as nonce data. For instance, the coordinate, or size of the first bar pattern recognized in the non-normalized image may be recorded and used as nonce data.

Various characteristics data generated during image processing or about the raw image can be used as nonce data. The data may be collected every time a physical token is captured and processed to decode the identity information. In some embodiments, data may be collected without image processing operations. Data may be generated by any analysis as described elsewhere herein without alternating the image data. As a physical token may be captured for an authentication event, the data generated from processing the image data of the physical token may be automatically collected and used as nonce data.

Data about a state of the imaging device and a state of the image data captured may be used as nonce data for an authentication event. The Authentication events may occur at different points in time. A user may provide authentication and/or participate in a transaction at different points in time. While it is possible that the same imaging device may be used to capture the same physical token by the same user, it is highly unlikely that they will have a completely identical data about the image and/or data generated from image processing (e.g., skew angle, rotation angle, histogram, intensity, etc). At least some minor variation may be expected in the data between authentication events. Thus, if the data from image processing or data of the raw image taken at different authentication events are completely identical, it may be likely that a replay attack is occurring. For instance, a fraudster may have previously recorded an authentication event (e.g., previous transaction, user authentication, account access), including the data of the state of the image, and is replaying the previous authentication event. Particularly when the device is a mobile device or handheld device, the image data information is likely to change.

Even if the device is resting on a surface during an authentication event, user interaction with the imaging device may cause some imaging conditions change such as focus distance, viewing angle, steadiness and the like. For instance, the distance between the imaging device and the target object may be translated into a large range of possible sizes (magnifications) that a barcode can have on a fixed size image sensor. In another instance, taking image of the barcode at an angle changes the apparent shape of the barcode to a viewer (skewness).

Even if the user does not directly touch the device, environmental conditions such as illumination may cause some variables change (e.g., noise, intensities, white balance, etc). For instance, the imaging device may rely solely on the ambient light for illumination during capturing image data. The highly variable ambient light may cause auto adjustment of various imaging device parameters. The highly variable ambient light may also result in shadows, shading across the length of a barcode, overexposure, underexposure, and similar characteristics change of the captured image data.

Thus, an authentication event, such as a user authentication process or transaction, may be assessed for likelihood of tampering or fraud. An identity of a user may be verified and/or a transaction may be authenticated when the information of the imaging device and image data does not provide an increased likelihood of fraud.

Figure 4:
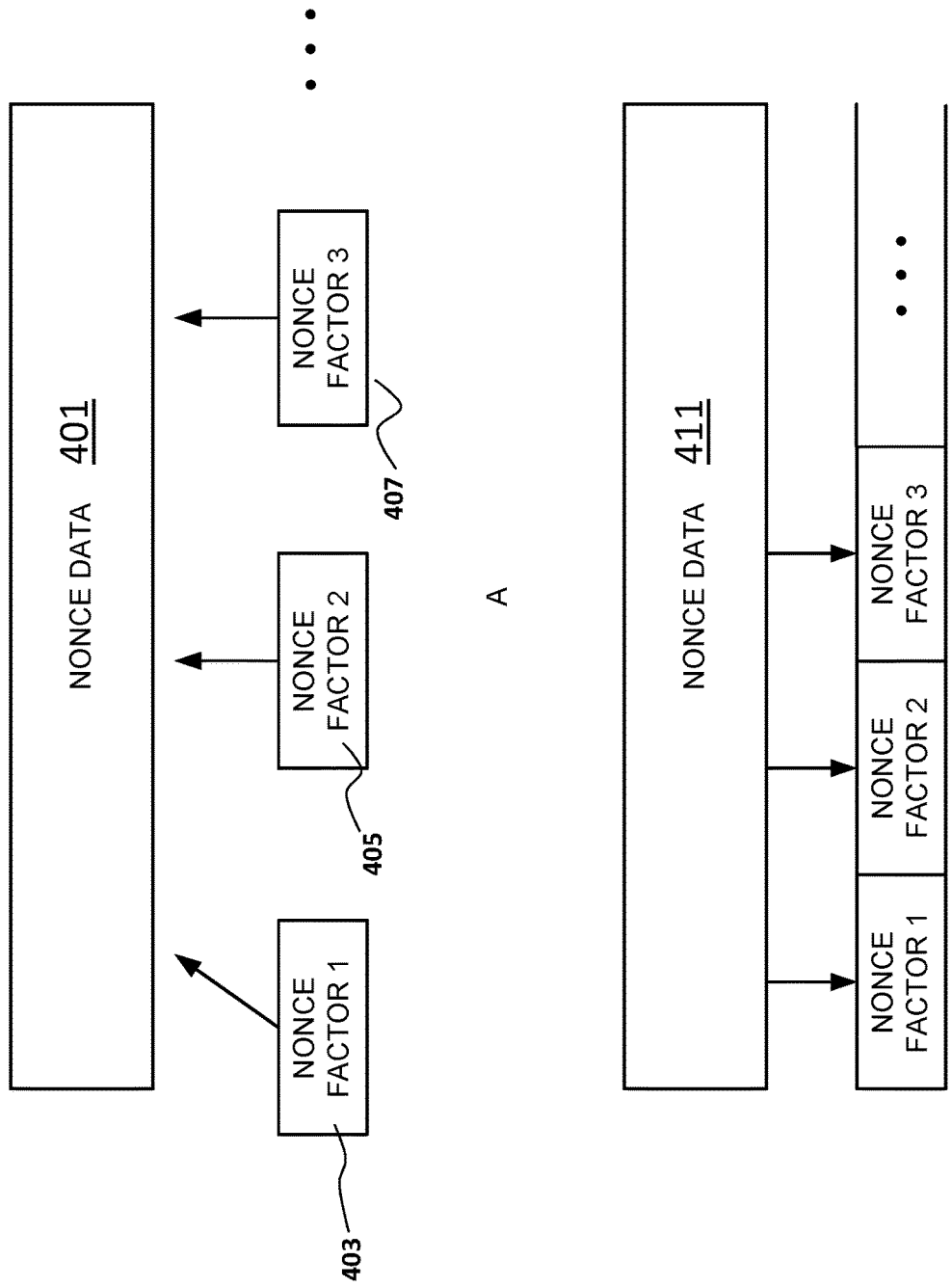
FIG. 4 shows examples of how nonce data may be generated or stored, in accordance with embodiments of the invention.

FIG. 4 shows examples of how nonce data may be generated or stored, in accordance with embodiments of the invention. Any description herein of a nonce data may apply to any type of singularity value. Any description of nonce data may apply to various device measurements, indices, or parameters that may be unlikely to repeat. Any description of nonce factors may apply to various device measurements, indices, or parameters that may be unlikely to repeat. Nonce data may include or be derived from one or more nonce factors.

One or more nonce factors (e.g., Nonce Factor 1 403, Nonce Factor 2 405, Nonce Factor 3 407, ...) may be used to form a set of nonce data 401. Nonce factors may include various types of data collected about a state of the imaging device and/or a state of the captured image data. Nonce factors may include various types data related to different characteristics of the imaging device and the captured image data. Nonce factors may include data from various sensors of the user device. Nonce factors may include various types of data collected about a state of the user device. The nonce factors may each be taken at a single point in time, multiple points in time, or over a time interval. Each of the nonce factors may be from different points in time, or may be from times that coincide and/or overlap. Each of the nonce factors may include data collected from different sensors or types of sensors of the device. Alternatively, two or more of the nonce factors may be collected from the same sensor or type of sensor. In some instances, all of the nonce factors may be collected from the same sensor or type of sensor.

In one example, nonce data may 401 be derived from a single nonce factor. In some embodiments, a single nonce factor may be information related to a group of characteristics. For instance, the single nonce factor may be processed data related to the barcode region with respect to an image frame. In this case, the single nonce factor may include a group of characteristics about the barcode region such as coordinate of a corner of the barcode region, rotation angle, center of gravity, width and height and the like. In another instance, the single nonce factor may be the raw positional data of the imaging device, thus the single nonce factor may include a group of characteristics such as attitude, latitude and the like. In another instance, the single nonce factor may be information related to operational parameters of the imaging sensor, such as ISO speed, exposure time, or any other type of data as described elsewhere herein. A single nonce factor may include any number of characteristics data. The nonce data may be the raw data read from sensors directly, or may be derived or processed based on the raw data. If information about the group of characteristics is identical between authentication events, then the nonce data may also be identical between authentication events.

As shown in Scenario A, nonce data may be derived from multiple nonce factors. For instance, a first nonce factor may include imaging device data and a second nonce factor may include image characteristic data. If the imaging device data and the image characteristic data are identical between authentication events, then the nonce data may also be identical between authentication events. If both the imaging device data and image characteristic data are different between authentication events, then the nonce data may be different between authentication events. If at least one of the imaging device data and the image characteristic data are different between authentication events, then the nonce data may likely be different between authentication events.

If at least one nonce factor of a plurality of nonce factors is different between authentication events, then the nonce data may reflect this difference, and may be different between authentication events. In some instances, if even a single nonce factor is different between authentication events, the nonce data may be different between the authentication events. For instance, each of the nonce factors may need to be a 100% match for the nonce data to be a 100% match between authentication events. This may be like particularly true when the nonce data is derived from the plurality of nonce factors. For instance, the nonce data may be generated based on an algorithm that considers the nonce factors. The nonce data may be a hash of the various nonce factors. The nonce data may include a value or string that may be derived based on the various nonce factors. In some instances, distinguishing information about each of the nonce factors may not be determined from the nonce data. For instance, the separate nonce factors may not be derivable or separated from the nonce data. Alternatively, distinguishing information about each of the nonce factors may be determined from the nonce data. For instance, the separate nonce factors may not be derivable or separated from the nonce data.

As shown in Scenario B, nonce data 411 may include a collection of multiple nonce factors. For instance, a first nonce factor may include imaging device data and a second nonce factor may include image characteristic data. If the imaging device data and the image characteristic data are identical between authentication events, then the nonce data may also be identical between authentication events. If both the imaging device data and image characteristic data are different between authentication events, then the nonce data may be different between authentication events. If at least one of the imaging device data and the image characteristic data are different between authentication events, then the nonce data may likely be different between authentication events. However, it may be possible to distinguish which sets of nonce factors are different between the authentication events and which are different.

If at least one nonce factor of a plurality of nonce factors is different between authentication events, then the nonce data may reflect this difference, and may be different between authentication events. In some instances, if even a single nonce factor is different between authentication events, the nonce data may be different between the authentication events. For instance, each of the nonce factors may need to be a 100% match for the nonce data to be a 100% match between authentication events. However, each of the nonce factors may be distinguishable so it can be determined which nonce factors are a match and which aren't. For instance, the nonce data may just be a collection of various nonce factors, or may append various nonce factors together. In some instances, distinguishing information about each of the nonce factors may be determined from the nonce data. For instance, the separate nonce factors may be derivable or separated from the nonce data. Alternatively, distinguishing information about each of the nonce factors may be determined from the nonce data. For instance, the separate nonce factors may not be derivable or separated from the nonce data.

Allowing the various nonce factors to be individually distinguishable may advantageously permit greater granularity into determination of whether a replay attack is occurring. For instance, different nonce factors may be weighted differently. For instance, nonce factors that are more likely to be different between authentication events may be weighted more than nonce factors that may be less likely to be different between authentication events. In one example, it may be extremely unlikely that data of the orientation and coordinate of the barcode region may be identical between authentication events. However, while it is likely there may be some variation in a state of the imaging device (e.g., exposure time, ISO speed, etc), it may be a factor where repetition may be more possible. In such an event, the data of the orientation and coordinate of the barcode region may be weighted more. The weighting may be considered during an assessment of a replay attack.

Looking at individual factors may also be useful when there may only be certain portions of the data that are likely to be recorded and/or replayed. For instance, in some embodiments, during a replay attack, all data pertaining to the physical token may be recorded and replayed. In such a scenario, any deviation in any of the factors may reduce the likelihood that a replay attack has occurred. In other embodiments, during a replay attack, only selected data pertaining to physical token may be recorded and replayed. For instance, only image characteristic data may be recorded and replayed while data about the state of the imaging device is not replayed. In such as a scenario, the 100% match of one of the factors (e.g., orientation, skewness of the barcode region) may be sufficient to provide a likelihood that a replay attack has occurred. In some embodiments, the systems and methods provided herein may take into account how nonce data is collected and/or being considered. If the nonce data is collected in a way that any replay would automatically put all the nonce factors together, then any deviation in the nonce data may be sufficient to indicate that a replay attack is unlikely. If the nonce data is collected in a way that the separate nonce factors could be separated and/or provided individually, then a 100% match of a nonce factor, particularly a nonce factor that is unlikely to repeat, may be enough to provide a high likelihood of a replay attack.

In determination of whether a replay attack has occurred, the various individual nonce factors may be considered (e.g., as shown in Scenario B). Alternatively, just the overall nonce data may be considered (e.g., as shown in Scenario A), and any degree of difference may reduce the likelihood of a replay attack. In some instances, the degree of difference may be considered in determining a likelihood of a replay attack. For instance, if all nonce factors are identical, there may be a high likelihood of a replay attack. If a single nonce factor is identical, and is one where repetition may be possible, then a moderate likelihood of replay attack may be provided, if no nonce factors are identical, then a low likelihood of replay attack may be provided.

FIG. 5 shows examples of how data may be stored for various transactions, in accordance with embodiments of the invention. The data may be used to identify users and/or fraudulent transactions, in accordance with an embodiment of the invention. Transactions may occur as previously described elsewhere herein.

The data may be the historic data collected from one or more authentication events, such as one or more transactions. The historic data may all be stored together in a single memory unit or may be distributed over multiple memory units. Data distributed over multiple memory units may or may not be simultaneously accessible or linked. The historic data may include data for a single user, or from multiple users. Data from multiple users may all be stored together or may be stored separately from one another. The historic data may include data collected from a single user device or from multiple user devices. Data from multiple user devices may all be stored together or may be stored separately from one another. In some instances, a single user device may be provided for a single user. Alternatively, multiple users may use a single user device, or a user may use multiple user devices when performing authentication events.

The stored data may include information such as a transaction ID 501, and/or transaction related data. Any discussion herein referring to a transaction may refer to any type of authentication event. For instance, any discussion herein of a transaction may also apply to any authentication of a user and/or access to a user account.

The transaction ID 501 may be a unique identifier that identifies a particular transaction, e.g., TID 1, TID 2, TID 3, TID 4, etc. As previously described, a transaction may be any time a user or user device performs an authentication event. The transaction as provided in the historic data may be stored regardless of whether an issue is flagged and/or any transfer of money, goods, or services is permitted to move forward to completion.

Any type of identification related data 503 may be stored, e.g., ID1, ID2, etc. The identification related data 503 may pertain to a user that is allegedly performing the transaction, information about the user's device, or any information that is specific to a transaction itself. The identification related data may include authentication data. For instance, a username, password or phrase, encrypted key, biometric data (e.g., fingerprint, optical scan, handprint, voiceprint), or any other type of information used to authenticate a user may be provided.

The identification data 503 may include the user's name, an identifier unique to the user, or any personal information about the user (e.g., user address, email, phone number, birthdate, birthplace, website, social security number, account number, gender, race, religion, educational information, health-related information, employment information, family information, marital status, dependents, or any other information related to the user). The personal information about the user may include financial information about the user. For instance, financial information about the user may include user payment card information (e.g., credit card, debit card, gift card, discount card, pre-paid card, etc.), user financial account information, routing numbers, balances, amount of debt, credit limits, past financial transactions, or any other type of information.

The identification data 503 may pertain to the physical token. For instance, a unique physical token such as barcode on an ID card may be provided. Identification information encoded in the barcode may be provided.

The identification data 503 may pertain to the user's device. For instance, a unique device identifier may be provided. Device fingerprint data (e.g., information about one or more characteristics of the device) may be provided. Information collected regarding the device's clock, device's IP address, applications running on the device, or any other information relating to the device may be collected.

Transaction-specific information may be incorporated. For instance, the nature of the transactions, the entities involved the transaction, the time of the transaction, the amount of any finances or exchanges of goods or services for the transaction, account numbers involved in the transaction, or any other information pertaining to the transaction may be provided.

In some embodiments, the identification data 503 may be provided by a physical token. The physical token can be the same token as described in FIG. 2. Identification data may be obtained by scanning the physical token using a user device, and the scanned image data may be processed for decoding the identification data. The decoded identification data may or may not be a previously encrypted data. In some embodiments, the identification data stored in the database is encrypted cypher text. Optionally, the identification data stored in the database is plain text data.

When an identification data is obtained, nonce data may be collected automatically. Nonce data may be collected when an image of the physical token is captured. Nonce data may be collected when an image of the physical token is processed or analyzed.

In some embodiments, nonce data 505 may be collected without requiring additional sensors or additional operations. For example, nonce data about information of a state of an imaging device may be collected from metadata of a captured static token without additional measurement or any operations. In another example, nonce data about a state of imaging data may be collected during image processing without any additional calculations or analysis.

When an authentication event occurs, nonce data 505 may be collected. The nonce data may include information about a state of an imaging device, a state of the captured static token, and/or a user device. The nonce data may be data that is extremely unlikely to repeat in a subsequent authentication event. The nonce data may include data or be derived from data collected at a single point in time, or from multiple points in time (e.g., at various time intervals or continuously within a time range). The nonce data may be stored as a single or multiple sets of data. The nonce data may be denoted as ND1, ND2, ND3, etc.

The historic data may be analyzed to identify a device and/or user, or authenticate a user. As illustrated, the first two transactions may not raise any red flags. For instance, for TID 1, TID 2, the identification data ID1 and ID2 may be different since they are for different transactions, and the nonce data ND1 and ND2 may also be different since both sets of data are changing.

In the third scenario, TID 3, a red flag may be raised. While a separate transaction is occurring, the same identification data ID 1 may indicate it's supposed to be the same identity (e.g., user) as TID1. The nonce data ND3 may show that some information is different between TID 1 and TID 3, so that it is unlikely the same transaction. It may indicate the same user perform different transactions. The fact that the identification information ID 1 is identical between TID 1 and TID 3 may be contradictory and increase a likelihood of fraud.

The fourth scenario shows a possibility of raising a red flag. For instance, TID 4 is shown to be a separate transaction, but has the same identification data ID 2 and a second transaction TID 2. The nonce data ND 2 may also be shown to be the same between TID2 and TID 4. Nonce data may be extremely unlikely to repeat or may never repeat. A repeat of the nonce data may indicate a replay attack. Thus, a high likelihood of a replay attack may be flagged for the fourth transaction TID 4.

While it may be possible for an imaging device to have a set of similar operation parameters (e.g., same exposure time) as an event, it is highly improbable that the information will be an exact match (e.g., a highly precise orientation and/or spatial location will be an exact match, or a highly precise coordinate, orientation, skewness, size of the static token with respect to an image frame), particularly when the data includes measurements that are determined to a high level of accuracy and/or precision, as previously described. Thus, there may be some chance of a replay attack in the fourth scenario.

In some scenarios, the nonce data 505 may include nonce information collected at multiple points in time during an authentication event. In one example, nonce information may be collected when a user initiates an imaging device, after capturing an image data, after a static token is decoded, or anywhere in between.

Such scenarios are provided by way of example only. Authentication events may include identifying a device and/or user. For instance, identification information may be used to identify a user and/or device. The identification information may be compared with one or more previously stored sets of identification information. In some embodiments, when the identification information matches a previously stored set of identification information, it may be determined to belong to the same user and/or device.

Optionally, nonce data may be considered when identifying a user and/or device. The nonce data may be analyzed on its own and/or may be compared with one or more previously stored sets of nonce data. If the nonce data identically matches a previously stored set of nonce data, it may be determined that there is a chance of a replay attack. This may suggest that the user is not who the user is purporting to be, or that the user is providing falsified information.

Figure 6:
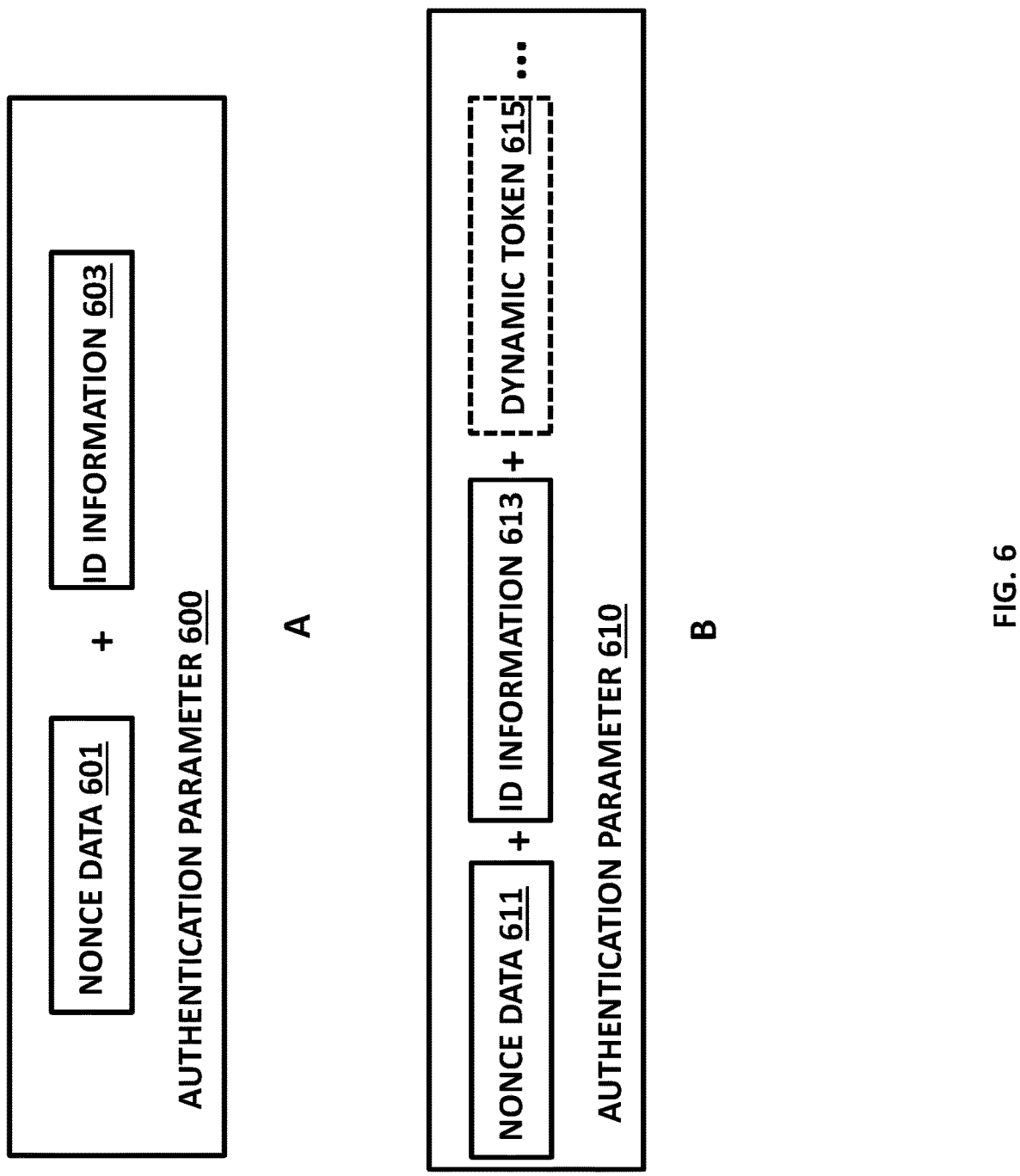
FIG. 6 shows how nonce data and identification data may be used to form an authentication parameter, in accordance with embodiments of the invention.

FIG. 6 shows how nonce data 601 and identification data 603 may be used to form an authentication parameter 600, in accordance with embodiments of the invention. Any description herein of nonce data may also apply to a authentication parameter, as provided herein. The authentication parameter may be a replay parameter, which may include nonce data and identification data. In some embodiments, the identification data may be a static data that pertain to a user, a physical token, a device, or a service. The nonce data may be dynamic data that changes from transaction to transaction. Thus the authentication parameter of the present invention may naturally change from transaction to transaction.

In some embodiments, the authentication parameter 600 may include identification data 603 and nonce data 601 as shown in scenario A. The identification data and nonce data may be collected during a same image capturing and analysis process. The identification data and nonce data may be collected using the same static token during a transaction.

The identification information/data 603 may include any type of information as described elsewhere herein. For instance, the identification information may pertain to a user, a user device, a physical token possessed by a user, and/or may pertain to an authentication event (e.g., transaction). The identification may be a single piece of information (e.g. unique identifier) or may include multi-factored information (e.g., any combination of other types of information as described elsewhere herein).

In some embodiments, the identification data 603 may be a static token. The static token may be provided by a physical token such as a barcode. The static token can be the same as described in FIG. 2. The identification data may be obtained by capturing an image of a physical token using a user device, processing the image data to decode the information. In some cases, image processing and decoding may be performed by one or more processors on board with user device. In other cases, image processing and decoding may be performed by one or more processors external to the user device. The captured image data containing the physical token may be transmitted to an external device for decoding and/or decryption, the external device as described elsewhere herein may analyze the information to make its own authentication or identification assessment. In this case, the captured image data may or may not be processed (e.g., compression) before transmitted to other devices.

The identification data 603 sealed with the nonce data 601 may be the data decoded from a physical token. For example, the identification data may be decoded from an imagery of a graphical code captured by a user device. The captured image may or may not be decoded on the user device. In some cases, the captured image may be decoded on board a user device. For instance, a PDF417 code on a driver license may be scanned using a user device and the user identity information may be decoded by an application or software implemented on the user device.

The decoded identification data may or may be not previously encrypted. The user device may or may not have access to an encryption key or method to decrypt the data. In some embodiments, the decoded data may be directly sealed with nonce data as a parameter used for authentication. In some embodiments, when the data is previously encrypted, it may be decrypted by the application or software on board the user device then sealed with the nonce data. In other embodiments, the user device may not decrypt the data, so that the data may be transmitted to an external device such as an entity involved in the transaction having the encryption key or password for assessment and analysis. The identification data sealed with the nonce data may be of any format and any data type, such as image data, binary, alphanumeric, ASCII, etc.

In some embodiments, the identification data may or may not be provided by the same image data as used for collecting nonce data. For example, nonce data may be collected from a state of imaging device when it is capturing image data, the same image data may not provide identification information. In another example, nonce data may be collected from a state of captured image data that contains a static token such as a graphical code, the static token may or may not provide identification information. In a different example, nonce data may be collected from a state of captured image data that contains a static token, where the static token may provide at least a portion of the identification information.

The nonce data 601 may be any type of nonce data, such as nonce data derived from one or more nonce factors, or that may include the one or more nonce factors in an individually accessible format. The nonce data may or may not itself be sealed. For instance, the nonce data may or may not be broken up or divided or derivable into its original nonce factors. Sealed nonce data may not permit the original nonce factors and/or raw data used to derive the nonce data to be accessed. Non-sealed nonce data may allow the original nonce factors and/or raw data used to derive the nonce data to be accessed.

The nonce data 601 and identification information 603 may be associated with one another. The nonce data and identification information may be linked or connected to one another. The nonce data and identification information may be used to derive an authentication parameter. If the nonce data is identical between authentication events, the authentication parameter may be identical between authentication events. In some instances, the authentication parameter may be identical between authentication events if the nonce data is identical and the identification information is identical. If the nonce data is identical and the identification information is not identical, the authentication parameter may optionally not be identical.

The nonce data 601 may be tied to an authentication event, where a purported user took part in the authentication event. For a subsequent authentication event, if the nonce data is different and the identification information for this authentication event is different, this may not raise any red flags, because it is likely that the nonce data would be different for a different authentication event. If the nonce data is different, but the identification information is the same, this may raise a question. For instance, if it is referring to the identical information is referring to the same authentication event, then the nonce data should be the same and would not be different. In another example, if the nonce data is the same and the identification information is different, this may raise a red flag and a likelihood of a replay attack. For instance, if a different authentication event is occurring, it is extremely unlikely that the nonce data would be a match. The nonce data is selected to include data that should change between authentication events. In another example, if the nonce data and the identification information is the same, this may occur if data is being recorded multiple times for the same authentication event. Alternatively, any indication of identical nonce data, even if the identification information is purportedly the same, may be a red flag or provide some possibility of a replay attack.

In some embodiments, the sealed authentication parameter 600 may include the nonce data and the identification information in an individually distinguishable or readable format. For instance, the nonce data may be assessed and read, and the identification information may be assessed and read. The sealed authentication parameter may permanently link together the nonce data and the identification information in an inseparable format. In alternative embodiments, the authentication parameter may not allow the nonce data and the identification information to be individually distinguished or readable.

In some embodiments, nonce data 601 and identification data 603 may be encrypted as sealed authentication parameters 600. The nonce data and identification data may be used as input parameters of a secret encryption algorithm implemented in order to produce the authentication parameter. Various methods can be used for encrypting the parameter. For example, symmetrical keys may be used for encryption and decryption. These keys can be composed from a sentence or a series of non-meaningful characters, and encryption is done by performing a bitwise XOR operation on data chunks (e.g., original data, structure data and Reed-Solomon data) that compose the parameter (e.g., nonce data and identification data). In another example, the nonce data and identification data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256, AES, Blowfish, RSA and the like. In some cases, a software and/application on the user device and other authentication system or entities involved in the transaction may possess the encryption key and the encryption method.

The combination of identification data and nonce data (sealed authentication parameter) can be used for authentication. The identification data may be provided by a static token. The identification data can be used for identifying a user and/or device. The nonce data may be collected from a process of capturing and analyzing the same static token. The nonce data can be used for fraud detection. The nonce data may be analyzed on its own and/or may be compared with one or more previously stored sets of nonce data. If the nonce data identically matches a previously stored set of nonce data, it may be determined that there is a chance of a replay attack. This may suggest that the user is not who the user is purporting to be, or that the user is providing falsified information.

In some embodiments, the authentication parameter 611 may include additional information as shown in scenario B of FIG. 6. The additional transaction information may be provided by various sources or means other than the image data used for collecting nonce data and identification data. For instance, during a transaction, a user may be prompted to scan a graphical code (e.g., barcode on an ID card) on a card or external device for authentication. In additional to the identification information 613 and nonce data 611 collected from the captured image, the user may also input other transaction information such as user account name, password, financial transaction value and the like. The additional information may be sealed with the identification data and nonce data and transmitted to the other entities involved in the transaction.

In another embodiment, the additional information may include data in response to a dynamic token 615. The dynamic token and the result data may be used to authenticate the user, the device, or the transaction and may add additional security to the authentication process. The dynamic token may be provided by an authentication system or an entity involved in a transaction and received by the user device. Different dynamic tokens may be generated for different transactions. The dynamic tokens may be initially generated by the authentication system and transmitted to the user device. A user may be authenticated when the returned dynamic token or information uniquely associated with the dynamic token matches the initial dynamic token.

In some embodiments, the dynamic token may be instructions including a set of operational parameters for an imaging device. The operational parameters may set several parameters of the imaging device to a fixed value during a transaction. For instance, the focus length, ISO speed, use of flash, and the like may be set to a fixed number when the camera is used for capturing image data of a graphical token. In some cases, the user may need to cope with the setting of the imaging device, for example by adjusting the distance between the physical token and the imaging device in order to focus the camera lens on the physical token.

Additional data 615 as a response to the dynamic token may be included in the sealed authentication parameter For instance, focus length, ISO speed, aperture time, shutter speed and the like that may be affected by the dynamic token may be collected and returned back to the authentication system or entity for verification or authentication.

Alternatively, nonce data may be analyzed as result of receiving the dynamic token. The dynamic token may result in a change in the nonce data. As previously described, the nonce data may include operational parameters of an imaging device. Thus, assessing the corresponding data included in the nonce data may verify the validity of the sealed authentication parameter.

Figure 7:
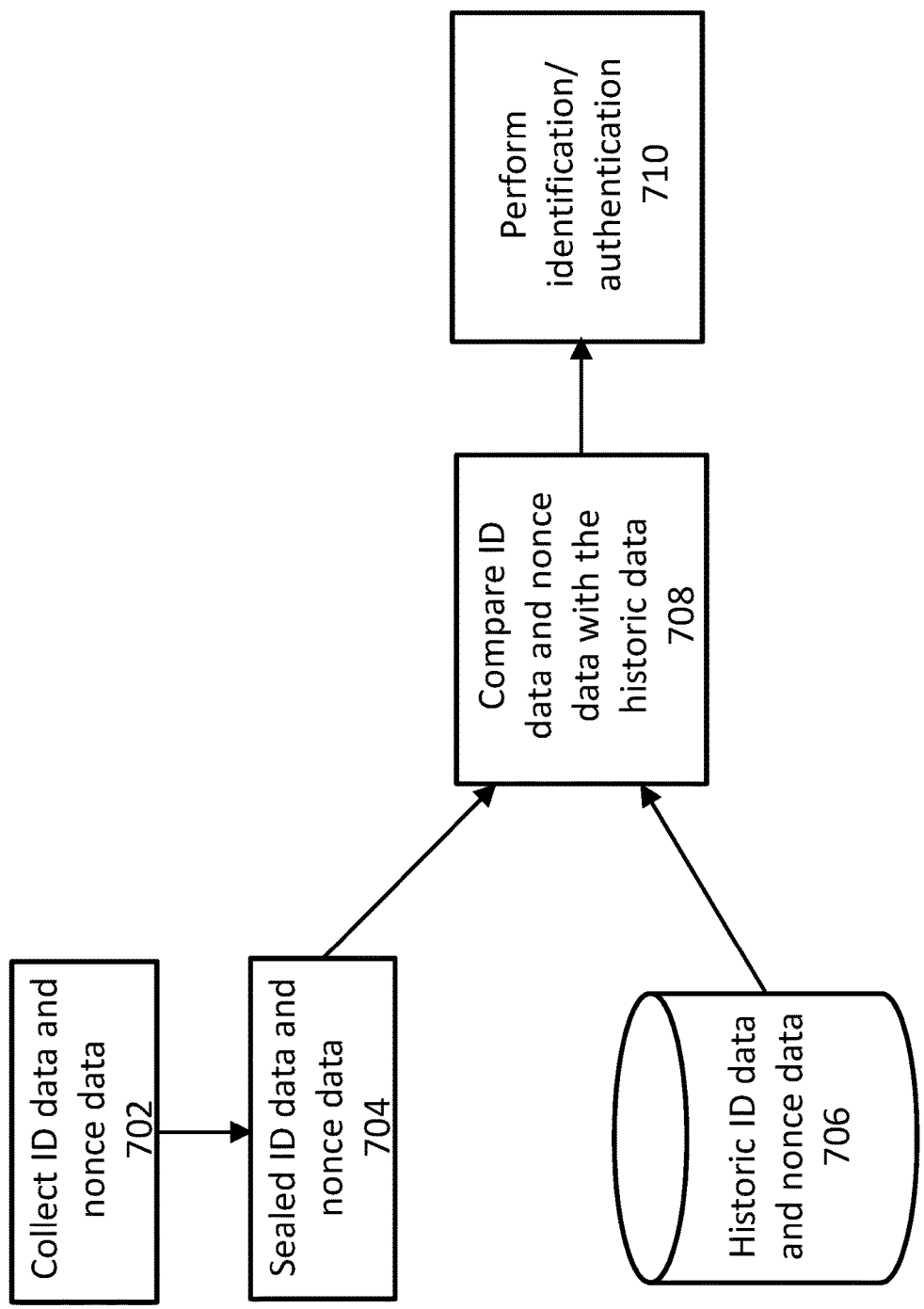
FIG. 7 shows an example of using identification data and nonce data to identify users and/or devices, in accordance with embodiments of the invention

FIG. 7 shows an example of a using identification data and nonce data to identify users and/or devices, in accordance with embodiments of the invention. A set of nonce data and identification data may be collected using a user device 702. The nonce data and identification data may be stored with historic nonce data and identification data 704. The nonce data and identification data may be compared with one or more previously collected sets of nonce data and identification data respectively 706. An identification of the user based on the comparison may be assessed 708. In some embodiments, a transaction may or may not be permitted based on the comparison. Optionally, an indication of a likelihood of fraud, such as a replay attack, may be provided.

A set of nonce data and identification data may be collected during an authentication event 702. The identification data may be provided by a physical token such as a visual graphical code as described elsewhere herein. An image data about the physical token may be captured by a user device. One or more processors may be configured to decode the captured visual graphical code and obtain the identification data. In some embodiments, the decoded identification data may be previously encrypted by a third-party such that the decoded identification data may or may not be readable without the encryption key. The identification data may be of any format and data type as described previously. The identification data may pertain to the visual graphical code. The identification data may pertain to a user. The identification data may pertain to a service.

As described elsewhere herein, the identification data may contain information that is pertained to the same physical token used as in the transaction event, same user, same service, or same transaction. Identification data may contain information used to authenticate or verify identity of a user. The identification data may contain personal information such as name, date of birth, address, nationality and the like that describe identity of a user. The identification data may contain product information such as instructions, purchase options, service provider information and the like that describe identity of a product or a service. The identification data may contain any type of information that can uniquely identify a user, a service, a transaction, etc.

The identification data may or may not be provided by the same image data as used for collecting nonce data. For example, nonce data may be collected from a state of imaging device when it is capturing an image data, where the same image data may not provide identification information. In another example, nonce data may be collected from a state of captured image data that contains a static token such as a graphical code, the static token may or may not provide identification information. In a different example, nonce data may be collected from a state of captured image data that contains a static token, where the static token may provide a portion of the identification information.

The nonce data may be collected concurrently with collecting the identification data. As described elsewhere herein, the nonce data may be collected when the physical token containing the identification data is scanned by an imaging device, processed and analyzed by one or more processors. The nonce data may be collected in response to a detection of an authentication event. The nonce data may be collected in response to a static token (e.g., visual graphical code) is captured by the user device using an imaging device. The nonce data may be collected with aid one or more processors on a user device. The nonce data may be collected with aid one or more sensors on a user device. The nonce data may be generated based on sensor data collected by one or more sensors on the user device. The nonce data may include or be derived from data about a state of the imaging device. The nonce data may include or be derived from data about a state of the captured image data. The nonce data may include or be derived from data about a state of the user device. The nonce data may include or be derived from data about a local state or environmental state of the imaging device. The nonce data may include imaging device operational parameters, image data characteristics, positional information, time-based information, or any other type of information as described elsewhere herein. The nonce data may include or be derived from data that is not likely to repeat between authentication events. The nonce data may include data that is less than 2%, 1%, 0.5%, 0.1%, 0.05%, 0.01%, 0.005%, or 0.001% likely to repeat between authentication events. The nonce data may represent a singularity value that is not to be repeated. In some embodiments, if the nonce data were to be 100% identical, it would be indicative of a replay attack, or be extremely likely to be a replay attack.

The nonce data may reflect a state of the imaging device and/or a state of the captured image data at a single point in time or over multiple points in time. The nonce data may be substantially unique for that authentication event. Collected data from a user device may optionally be communicated to a device external to the user device. The collected data may be interpreted on-board the user device to generate a set of nonce data. Alternatively, the device external to the user device may generate the nonce data based on collected data received. If an external device generates the nonce data, the nonce data may or may not be sent back to the user device.

Once a set of nonce data has been generated, it may be sealed with identification data for authentication 704. The sealed authentication parameter including the identification data and nonce data can be the same authentication parameter 600 as described in FIG. 6. The sealed authentication parameter may or may not be further encrypted to provide additional security to the transaction event. In some embodiments, the sealed identification data and nonce data may be transmitted to a transaction entity such as a server or other type of host device that requests authentication of the user.

The transaction entity may or may not need to decrypt the sealed authentication parameter to obtain the nonce data and identification data.

Once a set of nonce data has been generated, it may be stored together with the identification data as historic nonce data and historic identification data 706. The way nonce data and identification data are stored can be the same as described in FIG. 6. The historic nonce data and identification data may be stored in one or more memory units. The historic nonce data and identification data may be stored in a memory on-board the user device, on-board a device external to the user device (e.g., a host server, a separate device of any of the types described above), or distributed over multiple devices (e.g., peer-to-peer, cloud-computing based infrastructure, between the user device and an external device). In some embodiments, the nonce data may be generated on-board the user device and stored on-board the user device, an external device, or distributed over multiple devices. In other embodiments, the nonce data may be generated on-board an external device and may be stored on-board the external device, or the user device, or distributed over multiple devices. The one or more memory units may include databases. A single copy of the historic nonce data and identification data may be stored, or multiple copies may be stored. The multiple copies may be stored at different memory units. For instance, the multiple copies may be stored on difference devices (e.g., first copy on-board a user device, and second copy on-board an external device).

The historic nonce data may include data collected with aid of one or more sensors and one or more processors of a user device. The historic nonce data may include nonce data allegedly belonging to the same user, the same physical token, and/or associated with the same device. For instance, if a current set of nonce data is collected for a first user, the historic positional data may include nonce data collected for the same user. This may include all nonce data for the same user (and/or device) collected using the same device. This may or may not include 'registration' nonce data. In some embodiments, a user may register a user's identity and/or a user device's identity by performing an initial authentication. A set of nonce information generated from the initial authentication may be stored as the registration nonce data. Alternatively, no particular registration nonce data is created. The various nonce data from all the authentication events for the user (and/or same device) may be stored. Alternatively, only the registration nonce data may be stored. Alternatively, only the most recent set of nonce data for a particular user (and/or user device) may be stored. In some instances, only the X most recent sets of nonce data for a particular user (and/or device) may be stored, where X is a predetermined number, e.g., X=1, 2, 3, 4, 5, 6, 7, 8, 9, 10 or more.

In some embodiments, the historic nonce data may include nonce data collected by the user device belonging to any user that has interacted with the user device. For instance, multiple users may have performed transactions or authentication events using the user device. The historic nonce data may include nonce data belonging to various users (and/or devices of the same user or different users), which may include the allegedly same user. For instance, if a current set of nonce data is collected for a first device, the historic nonce data may include sets of nonce data collected for the same user as well as other users. This may include all nonce data for the one or more users collected using the same device. This may or may not include 'registration' nonce data. In some embodiments, a user may register the user or a user's device by performing an initial authentication event. A set of nonce data generated from the initial authentication event may be stored as the registration nonce data for that user, or for that device of the user. Such registration may occur for multiple devices and/or multiple users. In some instances, each device may need to be registered the first time they are used for an authentication event. Alternatively, no particular registration nonce data is created. The various sets of nonce data from all the authentication events may be stored. Alternatively, only the registration nonce data may be stored per device or per user. Alternatively, only the most recent set of nonce data per device or per user may be stored. In some instances, only the X most recent sets of nonce data per device or per user may be stored, where X is a predetermined number, e.g., X=1, 2, 3, 4, 5, 6, 7, 8, 9, 10 or more.

As previously described the historic data may pertain to data collected using a particular user device. Alternatively, data from user devices may be shared and/or aggregated. The historic data may include data from multiple user devices. The historic data may include nonce data collected through multiple user devices. This may include the same user or multiple users performing authentication events at a single user device or over multiple user devices. The historic data may include data pertaining to all users that may be interacting with a user device or multiple user devices that may be providing information to the historic nonce data database. For example, an external device, such as a server or any other device described elsewhere herein, may receive nonce data from one or more user devices and store the historic nonce data.

After a set of nonce data and identification has been collected, it may be compared with one or more previously collected sets of nonce data and identification data 708. This may include comparing the identification data with historic identification data for authentication or identification, then comparing the set of nonce data with historic nonce data associated with the identity for fraud detection. The set of nonce data may be compared with sets of nonce data that allegedly come from the same identification data (e.g., the same physical token of the user as the one that is being used for the authentication event, the same user, or the same user device, etc). For instance, the identification data may include identifying information such as a user's name or other identifier, or may be used to access an account where the user's name or other identifier may be accessed. The identification information may be used to identify the allegedly same user. For example, if the identification information indicates the user is John Doe, the set of nonce data may be compared to other sets of nonce data that belong to John Doe. This may be compared to nonce data for all cards of John Doe, or only the same physical token of John Doe as the one that is being used for the authentication event. If the collected nonce data identically match the previously stored nonce data, then there may be some suspicion raised whether the user is likely the same user that was previously identified as John Doe. An identical match may be highly unlikely to occur naturally and may be indicative of a replay attack.

The set of nonce data may be compared with any or all of the previously collected sets of nonce data that supposedly belong to the same user. This may be more specifically narrowed to the same physical token of the user, or may apply for any or all physical tokens of the same user. For instance, if a registration set of nonce data is provided, the collected set of nonce data may be compared with the registration set of nonce data. The collected nonce data may be compared with the registration nonce data without being compared with any other nonce data, may be compared with the registration nonce data and other nonce data, or may be compared with other nonce data without being compared with the registration nonce data. In some instances, the nonce data may be compared with the most recently collected nonce data. The nonce data may be compared with a predetermined number of most recently collected nonce data, e.g., the two most recently collected sets of nonce data, the three most recently collected sets of nonce data, the four most recently collected sets of nonce data, the five most recently collected sets of nonce data, and so forth for any number of most recently collected nonce data.

In some embodiments, the nonce data may be checked to see if they are within a predetermined range. If the nonce data are detected to be exceeding a pre-determined range, it is likely that the data is changed maliciously by a fraudster. For instance, the nonce data derived from orientation angle of the barcode region with respect to the image frame may be in the range (in a four digits format) from 0000 to 3600, if the number is detected to be out of the range such as 3800, it may indicate a fraud.

The nonce data may be compared with nonce data that allegedly come from any user that has identification information stored at the historic nonce data. When the set of nonce data is collected, identification information may be collected during the authentication event, which may include data about the user and/or user device. As previously discussed, the identification information may be used to identify the user. The identification information may be used to identify the allegedly same user. For example, if the identification information indicates or is used to find that the user is John Doe, the nonce data of the card may be compared to other nonce data that belong to John Doe as well as any other users that may have stored historic data. If the collected nonce data identically matches the previously stored nonce data, then it may raise a suspicion of a replay attack.

The set of nonce data may be compared with any or all of the previously collected sets of nonce data that supposedly belonging to any of the users participated in authentication events. For instance, if nonce data are provided for the various users, the nonce data may be compared with the registration nonce data of the various users. The nonce data may be compared with the registration nonce data without being compared with any other nonce data, may be compared with the registration nonce data and other nonce data, or may be compared with other nonce data without being compared with the registration nonce data. In some instances, the nonce data may be compared with the most recently collected nonce data for each of the users or devices of the users. The nonce data may be compared with a predetermined number of most recently collected nonce data, e.g., the two most recently collected sets nonce data, the three most recently collected sets of nonce data, the four most recently collected sets of nonce data, the five most recently collected sets of nonce data, and so forth for any number of most recently collected sets of nonce data.

An identification of the user based on the comparison may be assessed 710. The identification may include authentication of a user as being the actual user based on the identification data. If for the same identification data the collected set of nonce data raises a red flag when compared with previously stored sets of nonce data (e.g., when the matches are too identical), there may be an indication that the currently current authentication event is not being performed by the same user. For instance, if the nonce data does match identically, and there is a previous set of nonce data for John Doe, then the current user attempting the authentication may not be John Doe. The same identification and/or authentication may be performed for a user device. For instance, if a user device is identifying itself as a particular device, and the same nonce data is collected as for a previous authentication event, a red flag may be raised. There may be an indication that the current authentication event is not being performed by the same device, and that another device may be participating in a replay attack.

Optionally, an indication of a likelihood of fraud may be provided. For instance, if identification data identifies as a particular user (e.g., John Doe), and the nonce data identically matches the nonce data from an earlier authentication event of the same user (e.g., John Doe), then a possibility of fraud may be provided. The possibility of fraud may be a binary indicator (e.g., fraud alert, no fraud), or may be provided as a risk value (e.g., numerical value, such as a percentage, or graded value, such as a letter grade). For instance, a fraud grade of 9 may provide a higher likelihood of fraud than a fraud grade of 2.

The collected nonce data may be completely identical to the previously stored set(s) of nonce data to be considered an identical match (e.g. 100% match). A perfect 100% match may be suspicious. For instance, each time a user performs an authentication event, there is likely to be some minor variation. Physically it is extremely unlikely that an individual to perform an authentication event at exactly the same position (e.g., orientation and/or spatial location). In another example, it is also extremely unlikely to capture the exact same image of the physical token. Having the exact same characteristics may be an indicator of a type of replay attack.

In some embodiments, when a risk of fraud is detected, one or more individuals may be alerted. For instance, the user that is performing the authentication event may or may not be notified that their attempt at authentication was flagged with some risk of fraud. An entity with whom the user is attempting to conduct a transaction may or may not be notified of the risk of fraud. For instance, if the user is attempting to purchase an item from an e-commerce site, the e-commerce site may be informed that the transaction has been flagged with some risk of fraud. The transaction itself may or may not be permitted to continue. In some instances, if there is any risk of fraud, the transaction may be stopped. Alternatively, if there is some risk of fraud, but it is determined to be low, the transaction may continue while one or more parties are notified of some fraud risk and/or further checks may occur. If a risk of fraud exceeds a threshold level (e.g., reaches a moderate or high risk of fraud), the transaction may be stopped.

Any type of fraud may be detected. In some embodiments, the detected fraud may include a replay attack. During a replay attack, data may be recorded during an authentication event and then replayed in a subsequent authentication event, to pass off as the same user, user device, or cause the authentication event to be completed (e.g., transaction to be completed). The replay attack may be performed by a different user than an initial authentication event, or by the same user as the initial authentication event. The replay attack may be performed using the same device as the initial authentication event, or using a different device as the initial authentication event.

In some instances, the threshold for stopping the transaction may depend on the value of the transaction or other characteristics of the transaction. For instance, for high-value transactions, the threshold for stopping the transaction may be lower than for low-value transaction. For example, if the transaction is for a large monetary amount, even a low risk of fraud may cause the transaction to be stopped, while for a smaller monetary amount, a higher risk of fraud may be required to cause the transaction to be stopped. Alternatively, the threshold for stopping the transaction may be the same for all transactions.

The sealed nonce data and identification data may be collected during and/or in response to an authentication event. For instance, the nonce data and identification data may be collected when a user is attempting to self-identify and/or authenticate the user. The user may attempt to self-identify and/or be authenticated to access a user account and/or perform a transaction. The sealed nonce data and identification data may be used for authentication of a device and/or user individually, or in combination. The sealed nonce data and identification data may be used in authorization of a transaction individually, or in combination with other information, such as financial information. The sealed nonce data and identification data may be used for fraud detection alone.

In some embodiments, when the nonce data and the identification data are analyzed, the data for all may be collected from a single event. All of the nonce data and the identification data may be assessed simultaneously. In some other embodiments, the nonce data the identification data may be assessed in sequence or in various orders.

Various steps of the authentication process may be performed on a user device. The user device, as described elsewhere herein, can be for example, one or more computing devices configured to perform one or more operations consistent with the disclosed embodiments. For example, a user device may be a computing device that is capable of executing software or applications. In some embodiments, the software and/or application may be configured to collect identification data and nonce data 702 by enabling a user to scan a graphical code/token using the user device, process the captured image to decode the identification information and collect nonce data, transmit the sealed authentication data between the user device and other external devices or systems during a transaction 704. The software and/or application may or may not encrypt the sealed authentication data. In some embodiments, the software and/or application may be configured to prompt the user the type of physical token to be captured based on instructions received from other devices or entities involved in the transaction or pre-determined instructions.

In some embodiments, the software and/or application may be configured to compare the identification data and nonce data with historic data on the user device 708 then provide the assessment result to another device or system for further identification or authentication 710 during a transaction. In other embodiments, the software and/or application may be configured to operation the comparison 708 and identification/authentication 710 on the user device to complete a transaction.

The software and/or application may or may not be configured to seal the identification data and nonce data with additional transaction information. In some embodiments, the additional transaction information may be provided by various sources or means other than the image data used for collecting nonce data. For instance, during a transaction, a user may be prompted to scan a graphical code (e.g., barcode on an ID card) on a card or external device for authentication. In additional to the identification information and nonce data collected from the captured image, the user may also input other transaction information such as user account name, password, financial transaction value and the like. The additional information may be sealed with the identification data and nonce data and transmitted to the other entities involved in the transaction.

The software and/or application may be further configured to control the imaging device. In some embodiments, a dynamic token containing a set of operational parameters for the imaging device may be received by the software and/or application. The dynamic token can be same dynamic token as described in FIG. 6. Accordingly, the software may instruct the imaging device to capture image data using parameters based on to the dynamic token.

In other embodiments, nonce data may be used for fraud detection alone. The nonce data may be analyzed on its own and/or may be compared with one or more previously stored sets of nonce data. If the nonce data identically matches a previously stored set of nonce data, it may be determined that there is a chance of a replay attack. This may suggest that the user is not who the user is purporting to be, or that the user is providing falsified information.

Figure 8:
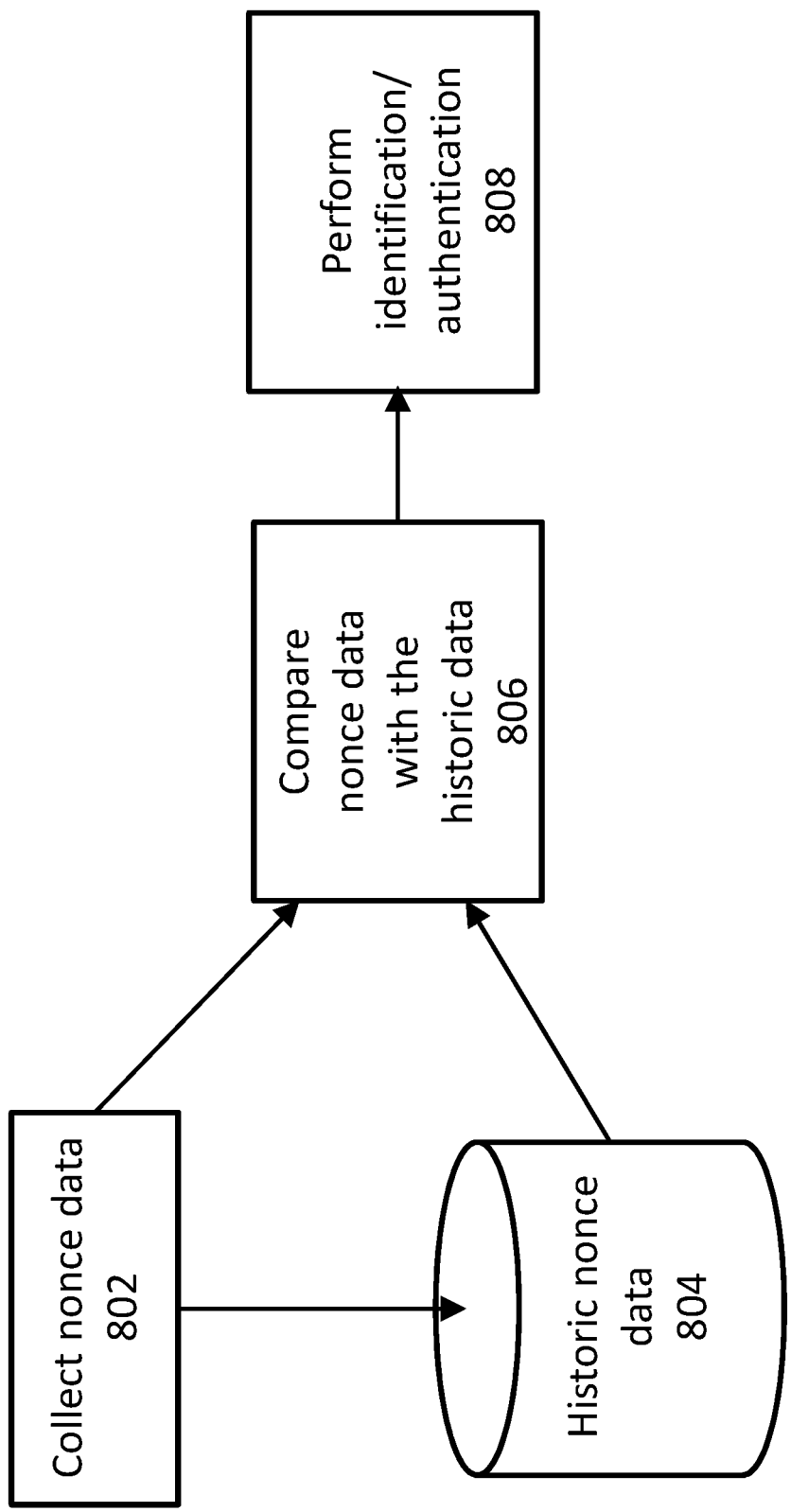
FIG. 8 shows an example of using nonce data to identify users and/or devices, in accordance with embodiments of the invention.

FIG. 8 shows an example of a using nonce data to identify users and/or devices, in accordance with embodiments of the invention. A set of nonce data may be collected using a user device 802. The nonce data may be stored with historic nonce data 804. The nonce data may be compared with one or more previously collected sets of nonce data 806. An identification of the user based on the comparison may be assessed 808. In some embodiments, a transaction may or may not be permitted based on the comparison. Optionally, an indication of a likelihood of fraud, such as a replay attack, may be provided. Any description of sealed authentication data elsewhere herein may also apply to nonce data, as provided herein.

A set of nonce data may be collected during an authentication event 802. The nonce data may be collected continuously, or in response to a schedule. The nonce data may be collected in response to a detection of an authentication event. The nonce data may be collected in response to an imaged based token is captured by the user device. The nonce data may be collected with aid one or more processors on a user device. The nonce data may be collected with aid one or more sensors on a user device. The nonce data may be generated based on sensor data collected by one or more sensors on the user device. The nonce data may include or be derived from data about a state of the imaging device. The nonce data may include or be derived from data about a state of the captured image data. The nonce data may include or be derived from data about a state of the user device. The nonce data may include or be derived from data about a local state or environmental state of the imaging device. The nonce data may include imaging device operational parameters, image data characteristics, positional information, time-based information, or any other type of information as described elsewhere herein. The nonce data may include or be derived from data that is not likely to repeat between authentication events. The nonce data may include data that is less than 2%, 1%, 0.5%, 0.1%, 0.05%, 0.01%, 0.005%, or 0.001% likely to repeat between authentication events. The nonce data may represent a singularity value that is not to be repeated. In some embodiments, if the nonce data were to be 100% identical, it would be indicative of a replay attack, or be extremely likely to be a replay attack.

The nonce data may reflect a state of the imaging device and/or a state of the captured image data at a single point in time or over multiple points in time. The nonce data may be substantially unique for that authentication event. Collected data from a user device may optionally be communicated to a device external to the user device. The collected data may be interpreted on-board the user device to generate a set of nonce data. Alternatively, the device external to the user device may generate the nonce data based on collected data received. If an external device generates the nonce data, the nonce data may or may not be sent back to the user device.

Once a set of nonce data has been generated, it may be stored with historic nonce data 804. The historic nonce data may be stored in one or more memory units. The historic nonce data may be stored in a memory on-board the user device, on-board a device external to the user device (e.g., a separate device of any of the types described above), or distributed over multiple devices (e.g., peer-to-peer, cloud-computing based infrastructure, between the user device and an external device). In some embodiments, the nonce data may be generated on-board the user device and stored on-board the user device, an external device, or distributed over multiple devices. In other embodiments, the nonce data may be generated on-board an external device and may be stored on-board the external device, or the user device, or distributed over multiple devices. The one or more memory units may include databases. A single copy of the historic nonce data may be stored, or multiple copies may be stored. The multiple copies may be stored at different memory units. For instance, the multiple copies may be stored on difference devices (e.g., first copy on-board a user device, and second copy on-board an external device).

The historic nonce data may include data collected with aid of one or more sensors and one or more processors of a user device. The historic nonce data may include nonce data allegedly belonging to the same user and/or associated with the same device. For instance, if a current set of nonce data is collected for a first user, the historic positional data may include nonce data collected for the same user. This may include all nonce data for the same user (and/or device) collected using the same device. This may or may not include 'registration' nonce data. In some embodiments, a user may register a user's identity and/or a user device's identity by performing an initial authentication. A set of nonce information generated from the initial authentication may be stored as the registration nonce data. Alternatively, no particular registration nonce data is created. The various nonce data from all the authentication events for the user (and/or same device) may be stored. Alternatively, only the registration nonce data may be stored. Alternatively, only the most recent set of nonce data for a particular user (and/or user device) may be stored. In some instances, only the X most recent sets of nonce data for a particular user (and/or device) may be stored, where X is a predetermined number, e.g., X=1, 2, 3, 4, 5, 6, 7, 8, 9, 10 or more.

In some embodiments, the historic nonce data may include nonce data collected by the user device belonging to any user that has interacted with the user device. The historic nonce data may include nonce data belonging to various users (and/or devices of the same user or different users), which may include the allegedly same user. This may include all nonce data for the one or more users collected using the same device. This may or may not include 'registration' nonce data. In some embodiments, a user may register the user or a user's device by performing an initial authentication event. A set of nonce data generated from the initial authentication event may be stored as the registration nonce data for that user, or for that device of the user. Such registration may occur for multiple devices and/or multiple users. In some instances, each device may need to be registered the first time they are used for an authentication event. Alternatively, no particular registration nonce data is created. The various sets of nonce data from all the authentication events may be stored. Alternatively, only the registration nonce data may be stored per device or per user. Alternatively, only the most recent set of nonce data per device or per user may be stored. In some instances, only the X most recent sets of nonce data per device or per user may be stored, where X is a predetermined number, e.g., X=1, 2, 3, 4, 5, 6, 7, 8, 9, 10 or more.

After a set of nonce data has been collected, it may be compared with one or more previously collected sets of nonce data 806. This may include comparing the set of nonce data with historic nonce data. The set of nonce data may be compared with sets of nonce data that allegedly come from the same user (or same user device). For instance, when the set of nonce data is collected, additional information may be collected during the authentication event, which may include authentication/identification information. The additional information may include identifying information such as a user's name or other identifier, or may be used to access an account where the user's name or other identifier may be accessed. The additional information may be used to identify the allegedly same user. For example, if the additional information indicates the user is John Doe, the set of nonce data may be compared to other sets of nonce data that belong to John Doe. This may be compared to nonce data for all cards of John Doe, or only the same user device of John Doe as the one that is being used for the authentication event. If the collected nonce data identically match the previously stored nonce data, then there may be some suspicion raised whether the user is likely the same user that was previously identified as John Doe. An identical match may be highly unlikely to occur naturally and may be indicative of a replay attack.

The additional information may include identification data as described elsewhere herein. The identification information can be the same identification information as described in FIG. 7.

The set of nonce data may be compared with any or all of the previously collected sets of nonce data that supposedly belong to the same user. This may be more specifically narrowed to the same device of the user, or may apply for any or all devices of the same user. For instance, if a registration set of nonce data is provided, the collected set of nonce data may be compared with the registration set of nonce data. The collected nonce data may be compared with the registration nonce data without being compared with any other nonce data, may be compared with the registration nonce data and other nonce data, or may be compared with other nonce data without being compared with the registration nonce data. In some instances, the nonce data may be compared with the most recently collected nonce data. The nonce data may be compared with a predetermined number of most recently collected nonce data, e.g., the two most recently collected sets of nonce data, the three most recently collected sets of nonce data, the four most recently collected sets of nonce data, the five most recently collected sets of nonce data, and so forth for any number of most recently collected nonce data.

In some embodiments, the nonce data may be checked to see if they are within a predetermined range. If the nonce data are detected to be exceeding a pre-determined range, it is likely that the data is changed maliciously by a fraudster. For instance, the nonce data derived from orientation angle of the barcode region with respect to the image frame may be in the range (in a four digits format) from 0000 to 3600, if the number is detected to be out of the range such as 3800, it may indicate a fraud.

The nonce data may be compared with nonce data that allegedly come from any user that has information stored at the historic nonce data. When the set of nonce data is collected, additional information may be collected during the authentication event, which may include data about the user and/or user device. As previously discussed, the additional information may include identifying information that may be used to identify the user. The additional information may be used to identify the allegedly same user. For example, if the additional information indicates or is used to find that the user is John Doe, the nonce data of the card may be compared to other nonce data that belong to John Doe as well as any other users that may have stored historic data. If the collected nonce data identically matches the previously stored nonce data, then it may raise a suspicion of a replay attack.

The set of nonce data may be compared with any or all of the previously collected sets of nonce data that supposedly belonging to any of the users participated in authentication events. For instance, if nonce data are provided for the various users, the nonce data may be compared with the registration nonce data of the various users. The nonce data may be compared with the registration nonce data without being compared with any other nonce data, may be compared with the registration nonce data and other nonce data, or may be compared with other nonce data without being compared with the registration nonce data. In some instances, the nonce data may be compared with the most recently collected nonce data for each of the users or devices of the users. The nonce data may be compared with a predetermined number of most recently collected nonce data, e.g., the two most recently collected sets nonce data, the three most recently collected sets of nonce data, the four most recently collected sets of nonce data, the five most recently collected sets of nonce data, and so forth for any number of most recently collected sets of nonce data.

An identification of the user based on the comparison may be assessed 808. The identification may include authentication of a user as being the actual user based on the authentication and/or identification information. If for the same additional information the collected set of nonce data raises a red flag when compared with previously stored sets of nonce data (e.g., when the matches are too identical), there may be an indication that the currently current authentication event is not being performed by the same user. For instance, if the nonce data does match identically, and there is a previous set of nonce data for John Doe, then the current user attempting the authentication may not be John Doe. The same identification and/or authentication may be performed for a user device. For instance, if a user device is identifying itself as a particular device, and the same nonce data is collected as for a previous authentication event, a red flag may be raised. There may be an indication that the current authentication event is not being performed by the same device, and that another device may be participating in a replay attack.

Optionally, an indication of a likelihood of fraud may be provided. For instance, if various authentication and/or identification information identifies as a particular user (e.g., John Doe), and the nonce data identically matches the nonce data from an earlier authentication event of the same user (e.g., John Doe), then a possibility of fraud may be provided. The possibility of fraud may be a binary indicator (e.g., fraud alert, no fraud), or may be provided as a risk value (e.g., numerical value, such as a percentage, or graded value, such as a letter grade). For instance, a fraud grade of 9 may provide a higher likelihood of fraud than a fraud grade of 2.

The collected nonce data may be completely identical to the previously stored set(s) of nonce data to be considered an identical match (e.g. 100% match). A perfect 100% match may be suspicious. For instance, each time a user performs an authentication event, there is likely to be some minor variation. Physically it is extremely unlikely that the exact same image data of a physical token is captured by an individual to perform an authentication event. Having the exact same characteristics may be an indicator of a type of replay attack.

In some embodiments, when a risk of fraud is detected, one or more individuals may be alerted. For instance, the user that is performing the authentication event may or may not be notified that their attempt at authentication was flagged with some risk of fraud. An entity with whom the user is attempting to conduct a transaction may or may not be notified of the risk of fraud. For instance, if the user is attempting to purchase an item from an e-commerce site, the e-commerce site may be informed that the transaction has been flagged with some risk of fraud. The transaction itself may or may not be permitted to continue. In some instances, if there is any risk of fraud, the transaction may be stopped. Alternatively, if there is some risk of fraud, but it is determined to be low, the transaction may continue while one or more parties are notified of some fraud risk and/or further checks may occur. If a risk of fraud exceeds a threshold level (e.g., reaches a moderate or high risk of fraud), the transaction may be stopped.

Any type of fraud may be detected. In some embodiments, the detected fraud may include a replay attack. During a replay attack, data may be recorded during an authentication event and then replayed in a subsequent authentication event, to pass off as the same user, user device, or cause the authentication event to be completed (e.g., transaction to be completed). The replay attack may be performed by a different user than an initial authentication event, or by the same user as the initial authentication event. The replay attack may be performed using the same device as the initial authentication event, or using a different device as the initial authentication event.

In some instances, the threshold for stopping the transaction may depend on the value of the transaction or other characteristics of the transaction. For instance, for high-value transactions, the threshold for stopping the transaction may be lower than for low-value transaction. For example, if the transaction is for a large monetary amount, even a low risk of fraud may cause the transaction to be stopped, while for a smaller monetary amount, a higher risk of fraud may be required to cause the transaction to be stopped. Alternatively, the threshold for stopping the transaction may be the same for all transactions.

The nonce data may be collected during and/or in response to an authentication event. For instance, the nonce data may be collected when a user is attempting to self-identify and/or authenticate the user. The user may attempt to self-identify and/or be authenticated to access a user account and/or perform a transaction. The nonce data may be used for identification individually, or in combination with other information. The nonce data may be used in authentication of a device and/or user individually, or in combination. The nonce data may be used in authorization of a transaction individually, or in combination with other information, such as financial information. The nonce data may be used for fraud detection alone, or in combination with other information.

In some embodiments, when the nonce data, and/or any other information are analyzed, the data for all may be collected from a single event. All of the nonce data and/or any other information may be assessed simultaneously. In some other embodiments, the nonce data and/or other information may be assessed in sequence or in various orders.

In some embodiments, the authentication parameter data may be used in performing an identification and/or authentication of the user. This may be used in a transaction process. A likelihood of fraud may or may not be assessed, using the authentication parameter. The authentication parameter data may optionally be used in a process similar to FIG. 7, where the authentication parameter may be stored in a historical database and compared. The authentication parameter data as described previously may include nonce data and identification data. In some embodiments, the identification data may be a static token.

Figure 9:
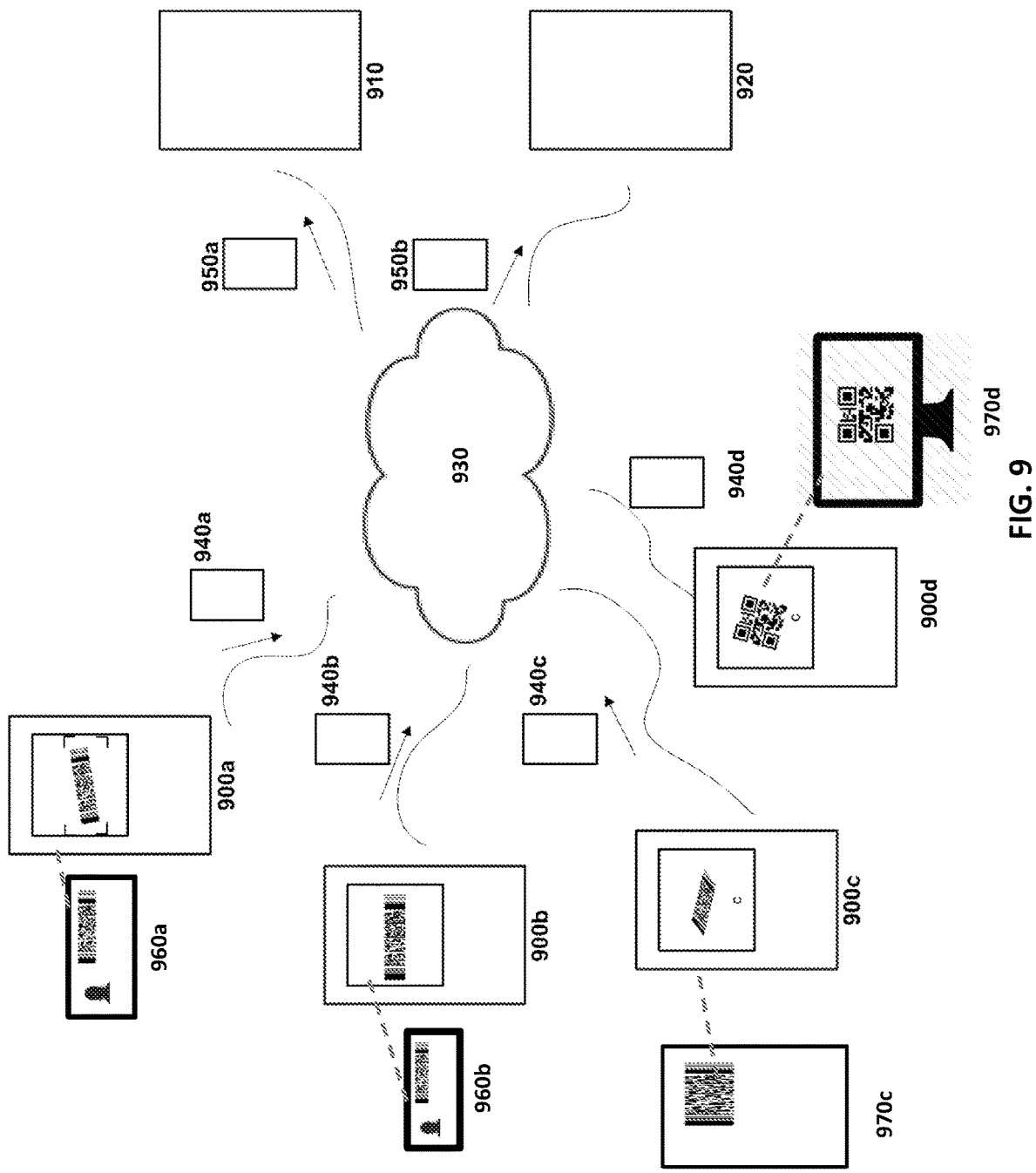
FIG. 9 provides examples of entities involved in an authentication event, in accordance with embodiments of the invention.

FIG. 9 provides examples of entities involved in an authentication event, in accordance with embodiments of the invention. As previously described, any type of authentication event may occur as described elsewhere herein may be used, such as various transactions. Authentications may be performed for various transactions that may or may not include the exchange of money and/or goods or services. Transactions may or may not include the exchange of information. Authentications may include any situation where a user may verify a user or user device's identity.

An authentication system may include one or more user devices 900a, 900b, 900c, 900d that may communicate with one or more external devices 910, 920. The one or more user devices may be associated with one or more respective users. Communications may occur over a network 930 or may occur directly. Physical tokens such as graphical codes 960a, 960b, 960c, 970d may be captured and analyzed by one or more user devices and data (e.g., identification data and nonce data) may be collected. Data from the one or more user devices 940a, 940b, 940c, 940d may be conveyed to the one or more external devices. In some embodiments, data received by a first external device 950a may be the same as data received by a second external device 950b, or the data may be different. In one example, a first external device may be or belong to an authentication server system (e.g., a server system configured to provide secure authentication), and/or a second external device may be or belong to one or more third parties (e.g., any transaction entity as described elsewhere herein, such as a merchant's system, a broker's system, or other entity requiring identity authentications).

The network 930 may be a communication network. The communication network(s) may include local area networks (LAN) or wide area networks (WAN), such as the Internet. The communication network(s) may comprise telecommunication network(s) including transmitters, receivers, and various communication channels (e.g., routers) for routing messages in-between. The communication network(s) may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocols.

The user devices 900a, 900b, 900c, 900d may include one or more characteristics of the various embodiments of the user devices described elsewhere herein. For example a user device may have one or more characteristics, components, or functions of the user device of FIG. 1. The user device may comprise an imaging device configured to capture static tokens. In some embodiments, a user device may include one or more processors configured to handle various requests from the user, the first external device 910, and/or the second external device 920. The user device may also include or have access to one or more databases for storing various information including but not limited to, transaction information, transaction data, authentication information, identification information, financial information, account information of the user associated with the user device, device information of the user device, device identifier of card reader(s) which may have interactions with the user device, nonce data, historic authentication data, and/or usage data associated with the user of the user device (e.g., other activity data associated with the user). Various types of user devices may be used to facilitate an authentication. An authentication system may include multiple types of user devices that may be used simultaneously.

The various types of user devices may include, but are not limited to, a handheld device, a wearable device, a mobile device, a tablet device, a laptop device, a desktop device, a computing device, a telecommunication device, a media player, a navigation device, a game console, a television, a remote control, or a combination of any two or more of these data processing devices or other data processing devices. Optionally a user device may be able to read a magnetic card, such as any type of payment card. The user device may be capable of performing an authentication read of a payment card. The user device may accept a swipe of the payment card and be able to read magnetic information from the payment card. The use device may be capable of reading one or more swipe characteristics of the payment card, such as swipe speed, direction, angle, variation, and/or inherent magnetic properties of the payment card. Alternatively, the user device may connect to a card reader having any of the functionality described herein.

A first external device 910 may include one or more processors. The first external device may be an authentication server system. The first external device may include or have access to one or more databases. The first external device may be in communication with one or more user devices 900a, 900b, 900c, 900d. The first external device may be in communication with various user devices with aid of a communication unit (e.g., an I/O interface). The first external device may be in communication with various transaction entity systems (e.g., merchant's system, broker's system, credit card companies, social network platforms, and/or other entities). The first external device may be in communication with various external server systems with aid of one or more I/O interfaces. The I/O interface to the user devices and/or the card readers may facilitate the processing of input and output associated with the user devices and/or the card readers respectively. For example, the I/O interface may facilitate the processing of a user input associated with a request for secure authentication. The I/O interface to external server systems may facilitate communications with one or more third-party entities (e.g., merchant's system, broker's system, credit card companies, social network platforms, and/or other entities).

The first external device may comprise memory storage units which may comprise non-transitory computer readable medium comprising code, logic, or instructions for performing one or more steps. The one or more processors of the first external device may be capable of executing one or more steps, for instance in accordance with the non-transitory computer readable media. In some embodiments, the one or more processors may generate or receive requests for performing secure authentications, processing the requests, comparing nonce data and identification data, identifying information needed for the authentications, performing the authentications, and returning the authentication results in response to the requests. The one or more databases may store various information, including but not limited to, corresponding nonce data, corresponding identification data, account information associated with each user, device information of the user device (e.g., a user device identifier), historic authentication data, and/or usage data associated with each user (e.g., activity data associated with each user).

The data stored about a user may include identification information about the user. The identification information may include name, data of birth, address, telephone number, gender, social security number, or any other personal information about the user.

The data stored about a user may include financial information about the user. The financial information may include card reader about the user and/or account information about the user. The card information of a user may include a card type (e.g., credit card, membership card, identity card, etc.), a card issuer (e.g., a credit carrier, a company, the government, etc.), a credit carrier type (e.g., Visa, Mastercard, American Express, Discover, etc.), a card number, a card expiration date, and/or a card security code. The account information may include user's name, user's mailing address, user's telephone number, user's email address, user's birthdate, user's gender, user's social security number, user account ID and associated password, or any other personal information about the user.

Transaction related data such as nonce data may be stored. The nonce data may be associated with the user or a user device for a particular authentication event (e.g., transaction). The nonce data may be derived or may include information about conditions or parameters of the device that are extremely unlikely to repeat (e.g., chance of repetition is less than or equal to 1%, 0.5%, 0.1%, 0.05%, 0.01%, 0.005%, 0.001%, 0.0005%, 0.0001%, 0.00005%, 0.00001%, 0.000005%, or 0.000001%), individually or in combination. The nonce data may represent a singularity value for the device at that particular point in time or time interval.

The sealed authentication parameter including the identification data and nonce data may be stored in the one or more database as described in FIG. 5.

The various types of information (e.g., financial information, user information, device information, and/or nonce data) may be obtained and stored in the databases of the first external device 950a during various authentication activities of the user. The first external device may have access to the databases or a subset of the databases for storing the various types of information. The various types of information may or may not also be obtained and stored during an initial registration of the user at the first external device (e.g., an authentication server system). In some embodiments, the various types of information may be accessible by the first external device. For instance, the second external device (e.g., a third-party entity) 920 may or may not be able to access the same databases or a subset of the same databases for storing the various types of information.

The second external device 920 may be or belong to a third-party entity. The third-party entity may be implemented on one or more standalone data processing apparatuses or a distributed network of computers. In some embodiments, the entity may also employ various virtual devices and/or services of third party service providers (e.g., third-party cloud service providers) to provide the underlying computing resources and/or infrastructure resources. In some embodiments, upon user's approval and in pursuance to related privacy policies, the third-party transaction entity may or may not store card information, account information, usage data, nonce data, and/or device information associated with the user. One or more third-party transaction entities may comprise e-commerce systems, retail systems, financial institutions (e.g., banks, brokers, and credit card companies), merchant's systems, social networking platforms, and/or other entities which the user performs authentications with. In some instance, the third-party entity may be an online e-commerce, and a user nonce data relating to a user's device may be analyzed to complete or deny a purchase of a product online. In some instance, the third-party entity may be a broker system, and nonce data may be analyzed for verifying transfers of funds between the user's financial account and the broker system. In some instance, the third-party entity may be a social networking platform which hosts a plurality of user accounts. A user may use the nonce data for verifying user's login to the social networking platform.

As previously described, data accessible by the first external device 950*a* and the second external device 950*b* may be the same or may differ. In some embodiments, the first external device may be an authentication system that may be capable of accessing a greater amount of data, and/or the second external device may be a third-party entity that may be capable of accessing a lesser amount of data. The first external device and the second external device may both be capable of accessing nonce data and/or any authentication event related data (e.g., transaction data). Alternatively, the first external device may be capable of obtaining the nonce data while the second external device may not be capable of accessing the nonce data, or vice versa. Optionally, authentication event related data or a subset thereof may be obtained by both the first external device and/or the second external device, or by only one of the first external device or the second external device.

The external device 950*a* and 950*b* may or may not be the entities provide the one or more physical tokens 960*a*, 960*b*, 960*c*, 960*d* to the users. The external device may or may not need to decrypt the identification data in order to verify or authenticate a user. In some embodiments, the external device 950*a* and 950*b* may be the entity providing a graphical code 970*d* on a display device for user to scan. The graphical code (e.g., QR code) may be proprietary such that it can be read only by an authenticated application provided by the authentication system running on a user device. In some instances, only the authentication system or the authentication application can encrypt/decrypt the graphical code. The graphical code may encode identification information that can be used as a static token to authenticate the user. When the code is scanned by the user device 900*d*, nonce data may be automatically generated and used for fraud detection.

Data 940*a*, 940*b*, 940*c*, 940*d* from the one or more user devices may be accessible by the first external device and/or second external device, as previously described. The data from the one or more user devices may include nonce data and identification data, and/or data about conditions or parameters of the device that may be used to derive or generate nonce data. For example, for an authentication event, the user devices may send corresponding nonce data and/or authentication event related information. The data may be sent in response to the authentication event. The data may be pushed by the user devices or may be pulled by the first external device or the second external device. The data may be sent in real-time. Alternatively, the data may be sent on a periodic basis or in response to a schedule. In some embodiments, the user devices may send data about a state of the imaging device or a state of the captured image data of a static token which may be used to generate the nonce data elsewhere (e.g., at the first external device and/or the second external device). The data about the state of the imaging device and captured image data are as described elsewhere herein. The data about the state of the imaging device and captured image data may include data collected with aid of one or more processors off-board the device. In some embodiments, the data about the state of the imaging device and image data may include raw or pre-processed data from one or more sensors and processors on- or off-board the device.

Steps for performing secure authentications may be implemented according to various embodiments. Requests for authentication may be initiated at user side. In some embodiments, a user may initiate a request for a secure authentication to complete a transaction. For example, during a transaction or a login process, the user may send a user input (e.g., by pressing a button or touching a touch screen of a user device) to indicate the user's intention to initiate a secure authentication for the transaction or the login process. In some embodiments, requests for secure authentication events may be initiated from a user device. In some instances, a request for a secure authentication may be initiated from an external device, such as an authentication server system. In some instances, a request for a secure authentication may be initiated from a third-party entity.

During initial registration of a user account with an authentication server system, the user may register for relevant account settings to require secure authentication for activities associated with this user account. During the following activities, an authentication server system may recognize a request for a transaction or a login process associated with the user account. In response to the request for the transaction, the authentication server system may send a request for a secure authentication to complete the transaction or the login process. During registration and/or the following account activities, the user may register to require authentication for all activities or some activities with certain conditions.

During initial registration of a user account with a third-party entity, the user may register for relevant account settings to require secure authentication for activities associated with this user account. For example, during initial setup of a user account to activate or manage a card on a bank's website or within the bank's application, the user may select to perform secure authentications for one or more transactions. During the following transactions, once the third-party transaction entity recognizes a transaction associated with the user account is requested, a secure authentication is required to complete this transaction using the card. During registration and/or the following account activities, the user may register to require authentication for all activities or some activities with certain conditions.

The secure authentication may require an analysis of the nonce data and identification data, as described elsewhere herein. The secure authentications may be required or provided as an option by an authentication server system for one or more activities. In some embodiments, the secure authentications may be required by a third-party entity. For example, a bank system or a broker system may require secure authentications to be performed to complete all or certain transactions (e.g., flagged transactions, transactions above a predetermined limit amount, or randomly selected transactions). In some instances, a secure authentication may be optional, but the third-party entity may offer rewards (e.g., cashback or bonus reward points) to the user if the user chooses to perform a secure authentication to complete the transaction.

The secure authentications may be required for all activities or some activities associated with the user account. For example, a secure authentication may be required when a transaction involves an amount of money equal to or greater than a predetermined threshold amount. For example, the predetermined threshold amount may be $100, $200, $500, $1000, $5000, $8000, $10,000, $15,000, $20,000. The threshold amount may be determined by the user, an authentication server system, or a third-party entity. In some embodiments, secure authentications may be required when the activities are identified as high risk activities. For example, the high risk activities may involve suspicious/mismatched user identity associated with the user account, suspicious transaction locations, repetitive entering of wrong user information, and/or flagged user account for previously associated fraudulent activates. In some embodiments, high risk activities may involve high speed transactions, such as requiring for funds to be transferred within a short period of time. When high speed transactions are identified, further security checks, such as nonce data analysis, may be required from the user. In some instances, the use of the further authentication may allow for online activities to occur in situations where previously in-person activity was required. The further assurances of a user's identity may aid in giving entities comfort in permitting larger scale transactions.

Nonce data combined with identification data may be used to perform an authentication for a transaction of exchanging money, goods, and/or services with a third-party entity. For example, the user may purchase an item online from the third-party entity (e.g., an e-commerce) using a user device (e.g., a tablet or a mobile phone). The user may perform the authentication on a website or in an application associated with the third-party entity.

In one example, after selecting the desired item to purchase and entering required information for the transaction (e.g., desired quantity of the item and relevant user information), the user may be prompted to perform a secure authentication. For example, when the user wants to purchase an item priced at $1000, the user may receive a notification on the display of the user device which requires the secure authentication. The notification may require the user to scan a physical token such as a PDF417 code on the user's ID card which causes nonce data to be generated for the transaction. The identification data from the PDF417 code may be used to verify or authenticate the user. The nonce data may be compared with historical nonce data associated with the same physical token to confirm that the nonce data is not repeating. If the nonce data is repeating, there may be further authentication checks required, or a red flag may be raised that there is a higher likelihood of a fraudulent event (e.g., replay attack). This may or may not cause the transaction to be denied or delayed.

In some other examples, the user may log into a registered user account on a website or in an application, such as a public service, an online voting system, a social networking service, etc. The user may receive a notification during the login process to perform the secure authentication, such as an identity verification. The notification may require the user to scan a physical token such as a graphical code on the user's document which causes nonce data to be generated for the transaction. The identification data from the graphical code may be used to verify or authenticate the user. The nonce data may be compared with historical nonce data associated with the same physical token to confirm that the nonce data is not repeating. The identity verification may be completed if the physical token is verified and the nonce data shows no indication of fraud.

In some embodiments, the third-party entity may generate the request to perform the secure authentication per requirement of the third-party entity or per user accounting settings registered with the third-party entity. The third-party transaction entity may send the request to the user device for display. The request may prompt the user to scan a graphical code such as a QR code displayed on a graphical user interface. Nonce data may be generated along with scanning of the QR code and sealed with the code to be used for authentication.

During a login process or any other type of authentication event, a secure authentication may be required by the authentication server system, the third-party entity, or the user. In response to the request, nonce data may be collected and/or analyzed with respect to a static token. Nonce data combined with the static token can be obtained and transmitted from the user device to the authentication server system and/or the third-party entity directly or indirectly. The user device information (e.g., user device identifier) may also be transmitted to the authentication server system and/or the third-party entity for verification.

The authentication server system may store or have access to various historic authentication information or registration information that can be used for authentication. The information may include but is not limited to, historic nonce data, transaction data, user account information, user device identifier, or any other type of information as described elsewhere herein. The third-party entity may also store or have access to various sets of historic authentication information or registration information that can be used for authentication, such as historic nonce data, transaction data, user account information, user device identifier, or any other type of information as described elsewhere herein.

The authentication may be performed by the authentication server system solely or the third-party entity solely. In some instances, the authentication may be performed by both systems in a combined manner. For example, some information may be verified at the third-party transaction entity, such as user account information, or user device identifier. Meanwhile, other information may be verified at the authentication server system, such as nonce data.

In some instances, the third-party entity may store or have access to only user account information without having access to other confidential and/or financial information of a user, such as nonce data. Thus when an authentication with the third-party entity requires an authentication, the third-party entity may designate the authentication server system to perform an authentication. The authentication server system may then perform the authentication and return a message to the third-party transaction entity indicating whether the authentication is approved or not. The authentication server may return the message based on an analysis of nonce data for the particular authentication event. The transaction may then be approved or rejected accordingly by the third-party entity.

In some embodiments, the authentication server system may be optional in the authentication system. Separate third-party entities may perform any step or all steps of the authentication.

In some embodiments, the authentication server system can simultaneously perform authentication for multiple authentications for different activities. The authentication server system may simultaneously perform authentication for multiple separate third-party entities. Information stored at or accessible to the authentication server system can be collected over multiple transactions associated with various third-party entities. For example, nonce data associated with various third-party entities may be accessible by the authentication server system. This may allow intelligence gathered from multiple transactions to be used in performing the authentication. The authentication server system may have access to data repository that the third-party entities individually may not have access to.

The authentication server system and/or the third-party entity may analyze the received information, and compare the received information with the corresponding information obtained from historic authentications and/or registrations. The comparison may include comparison of nonce data. The user login or transaction may be approved, rejected, or flagged as a risk authentication/login based on the comparison result. The user may be notified by the authentication server system or the third-party entity once the login or authentication is approved, rejected, or flagged.

Various embodiments may exist for evaluating the match between the collected data and historic authentication data or registration data. In some examples, when the collected data from the card reader matches the corresponding historic authentication data or registration data, a message may be sent to the third-party transaction entity to approve the authentication. In some examples, if nonce data (and/or one or more nonce factors of the nonce data) do not match, the authentication can be approved.

For instance, the collected nonce data may need to be at least slightly different from the previously stored set(s) of nonce data associated with the user and/or physical token. In some instances, a perfect 100% match may be suspicious. For instance, each time a physical token is imaged to perform an authentication, there is likely to be some minor variation. Physically it is extremely unlikely that the imaging device and imaging data have exactly the same conditions and characteristics. Having the exact same conditions and characteristics may be an indicator of a type of replay attack.

Depending on authentication analysis, which may include the analysis of the nonce data (and optionally additional analyses of other factors), an indication of fraud may be provided. The indication of fraud may relate to an indication of a replay attack. As previously described, an indication of fraud may provide an indication of a level of fraud risk. The level of fraud risk may optionally depend on the analysis of the nonce data. The level of fraud risk may depend on whether collected nonce data matches historic nonce data. The level of fraud risk may depend on how closely the nonce data matches the historic nonce data, and/or which nonce factors match. For instance, if the nonce data is a perfect a 100% match for all factors, the level of fraud risk may be very high. If the nonce data is mostly a match, but one of the nonce factors are different, the level of fraud risk may be moderate, and if most or none of the nonce factors are a match, the level of fraud risk may be low. The level of fraud risk may be proportional to how high a match the nonce data is. A higher match (e.g., greater number of factors that are a match) may correlate to a higher risk of fraud, a lower match may correlate to a lower risk of fraud.

In some embodiment, analysis of the nonce data may relate to a likelihood of a replay attack. Other types of fraud analysis may occur for the transaction. For instance, a fraud analysis may include an assessment of a likelihood of a replay attack, as well as other types of fraudulent attacks (e.g., phishing, man in the middle attacks, etc.). Other data, such as data regarding the user device, user account, transaction data, or any other type of data described elsewhere herein, may be analyzed to detect the various types of fraud. Depending on the fraud analysis, authentication may or may not be confirmed for the user and/or user device. This may optionally permit a transaction to be completed, or delay or deny the transaction.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A method for authenticating a user or a transaction, the method comprising:
   capturing image data of a physical token using an imaging device of a user device, wherein the image data includes a graphical code;
   obtaining identification information about the user from the image data by processing the image data;
   collecting, from the user device, multiple types of local data about one or more characteristics of processing the image data wherein the one or more characteristics of processing the image data relate to how the image data is processed to extract the identification information;
   generating nonce data by combining the multiple types of local data; and
   authenticating, with aid of one or more processors, the user or the transaction based on (1) the identification information and (2) the nonce data, wherein the nonce data and identification data are compared with a previously collected nonce data and a previously collected identification data to determine a presence of a replay attack.

2. The method of claim 1, wherein the physical token comprises the graphical code that comprises the identification information about the user.

3. The method of claim 1, wherein the physical token is a driver license, a passport or a document issued by an authority entity and is associated with an identity of the user.

4. The method of claim 1, wherein the one or more characteristics of processing the image data comprise at least one item selected from the group consisting of: skewness, rotation angle, width, height, coordinate of a region containing the graphical code.

5. The method of claim 1, wherein the multiple types of local data further comprise data about a physical state of the user device which is collected using one or more sensors onboard the user device.

6. The method of claim 1, wherein the one or more characteristics of processing the image data comprises at least one of the following: (i) one or more parameters produced during image processing, (ii) one or more properties of the raw image data, and (iii) one or more properties of the processed image data.

7. The method of claim 1, wherein the nonce data is encrypted such that the multiple types of local data are not accessible by the one or more processors.

8. The method of claim 1, wherein the multiple types of local data are weighted to generate the nonce data.

9. The method of claim 8, wherein a weight assigned to a given type of local data is determined based on a variation of the given type of local data between different authentication events.

10. A system for performing authentication of a user or a transaction, the system comprising:
a server in communication with a user device configured to permit a user to perform a transaction, wherein the server comprises: (i) a memory for storing a set of software instructions, and (ii) one or more processors configured to execute the set of software instructions to:
receive an image data of a physical token possessed by the user, wherein the image data is captured by an imaging device of the user device;
obtain identification information about the user from the image data by processing the image data;
receive multiple types of local data about one or more characteristics of processing the image data, wherein the one or more characteristics of processing the image data relate to how the image data is processed to extract the identification information;
generate nonce data by combining the multiple types of local data; and
authenticate the user or the transaction based on (1) the identification information and (2) the nonce data, wherein the nonce data and identification data are compared with a previously collected nonce data and a previously collected identification data to determine a presence of a replay attack.

11. The system of claim 10, wherein the physical token comprises a graphical code that comprises the identification information about the user.

12. The system of claim 10, wherein the physical token is a driver license, a passport or a document issued by an authority entity and is uniquely associated with an identity of the user.

13. The system of claim 10, wherein the multiple types of local data further comprise one or more operational parameters of the imaging device and the one or more operational parameters are varied in response to an instruction generated by the system.

14. The system of claim 10, wherein the multiple types of local data further comprise data about a physical state of the user device which is collected by one or more sensors onboard the user device.

15. The system of claim 14, wherein the physical state of the user device comprises data indicative of a physical state of a component of the user device, and wherein the component is selected from the group comprising an imaging device, a power supply unit, a processor, and a memory.

16. The system of claim 10, wherein the one or more characteristics of processing the image data comprises at least one of the following: (i) one or more parameters produced during image processing, (ii) one or more properties of the raw image data, and (iii) one or more properties of the processed image data.

17. A method for authenticating a user or a transaction with anti-replay protection, the method comprising:
capturing image data of a physical token using an imaging device of a user device;
obtaining identification information about the user device or the user by processing the image data;
collecting from the user device, multiple types of local data about one or more characteristics of processing the image data, wherein the one or more characteristics of processing the image data relate to how the image data is processed to extract the identification information;
generating nonce data by combining the multiple types of local data;
comparing, with aid of one or more processors, the nonce data and the identification information with a previously collected nonce data and a previously collected identification information; and
determining, with aid of the one or more processors, a presence of a replay attack when the nonce data and the previously collected nonce state data are identical.

* * * * *